(12) United States Patent
Lyndersay et al.

(10) Patent No.: US 9,703,596 B2
(45) Date of Patent: *Jul. 11, 2017

(54) SERVICE PLATFORM FOR IN-CONTEXT RESULTS

(75) Inventors: Sean Lyndersay, Mountain View, CA (US); Miladin Pavlicic, Sammamish, WA (US); Jane T. Kim, Seattle, WA (US); Jonathan Garcia, Duvall, WA (US); Steve Strauch, Redmond, WA (US); David L. Risney, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,241

(22) Filed: Mar. 26, 2012

(65) Prior Publication Data

US 2012/0204129 A1    Aug. 9, 2012

Related U.S. Application Data

(63) Continuation of application No. 11/953,835, filed on Dec. 10, 2007, now Pat. No. 8,146,110.

(51) Int. Cl.
*G06F 9/54* (2006.01)
*G06F 9/48* (2006.01)

(52) U.S. Cl.
CPC .............. *G06F 9/4843* (2013.01); *G06F 9/54* (2013.01)

(58) Field of Classification Search
CPC .................................. G06F 9/54; G06F 9/4843
See application file for complete search history.

(56) References Cited

U.S. PATENT DOCUMENTS

| | | |
|---|---|---|
| 5,818,446 A | 10/1998 | Bertram |
| 5,859,636 A | 1/1999 | Pandit |
| 6,072,486 A | 6/2000 | Sheldon et al. |
| 6,560,633 B1 | 5/2003 | Roberts |
| 6,678,696 B1 | 1/2004 | Helland |
| 6,785,670 B1 | 8/2004 | Chiang et al. |
| 6,839,650 B2 | 1/2005 | Sutton et al. |
| 6,912,582 B2 * | 6/2005 | Guo et al. ..................... 709/229 |
| 6,970,869 B1 | 11/2005 | Slaughter |
| 7,032,211 B1 | 4/2006 | Janzig et al. |
| 7,114,148 B2 | 9/2006 | Irving |
| 7,243,298 B2 | 7/2007 | Yozell-Epstein et al. |

(Continued)

FOREIGN PATENT DOCUMENTS

| | | |
|---|---|---|
| JP | 200747988 | 9/2008 |
| WO | WO-2007142430 | 12/2007 |

OTHER PUBLICATIONS

"Defining Cross-Browser Tooltips", *Mozilla Developer Network*, Retrieved from: <https://developer.mozilla.org/en/Defining_Cross-Browser_Tooltips> on May 19, 2011,(May 27, 2007),4 pages.

(Continued)

*Primary Examiner* — Charles E Anya

(57) ABSTRACT

Various embodiments provide a service platform that integrates services, such as web services and/or local services, across a variety of applications. In at least some embodiments, services can be integrated with legacy applications that are "unaware" of such services, as well as applications that are aware of such services.

20 Claims, 19 Drawing Sheets

(56) References Cited

U.S. PATENT DOCUMENTS

| | | | |
|---|---|---|---|
| 7,243,309 B2 | 7/2007 | Koay | |
| 7,343,625 B1 | 3/2008 | Zaidi | |
| 7,395,317 B2 | 7/2008 | Naick et al. | |
| 7,428,570 B2 | 9/2008 | Nobili | |
| 7,487,446 B2 | 2/2009 | Hargarten et al. | |
| 7,581,194 B2 | 8/2009 | Iwema et al. | |
| 7,607,136 B2 | 10/2009 | Kuno et al. | |
| 7,640,348 B2* | 12/2009 | Atwal et al. | 709/229 |
| 7,657,609 B2* | 2/2010 | Klevenz et al. | 709/218 |
| 7,716,234 B2* | 5/2010 | Naibo et al. | 707/760 |
| 7,721,228 B2 | 5/2010 | Burke et al. | |
| 7,949,230 B2 | 5/2011 | Tsukamoto | |
| 8,032,482 B2 | 10/2011 | Rosenberg et al. | |
| 8,117,542 B2 | 2/2012 | Radtke et al. | |
| 8,146,110 B2 | 3/2012 | Lyndersay | |
| 8,381,133 B2 | 2/2013 | Iwema et al. | |
| 8,464,168 B2 | 6/2013 | Bump et al. | |
| 2001/0034646 A1 | 10/2001 | Hoyt | |
| 2002/0073058 A1 | 6/2002 | Kremer et al. | |
| 2002/0080154 A1 | 6/2002 | Matthews, III et al. | |
| 2002/0085224 A1 | 7/2002 | Price et al. | |
| 2002/0186257 A1 | 12/2002 | Cadiz et al. | |
| 2003/0043200 A1 | 3/2003 | Faieta | |
| 2003/0090510 A1 | 5/2003 | Shuping | |
| 2003/0097233 A1 | 5/2003 | Sutton et al. | |
| 2003/0146939 A1* | 8/2003 | Petropoulos et al. | 345/810 |
| 2003/0164862 A1 | 9/2003 | Cadiz et al. | |
| 2003/0177248 A1 | 9/2003 | Brown et al. | |
| 2004/0054690 A1* | 3/2004 | Hillerbrand et al. | 707/104.1 |
| 2004/0068527 A1 | 4/2004 | Smith, III | |
| 2004/0157202 A1 | 8/2004 | Hopkins et al. | |
| 2004/0205672 A1 | 10/2004 | Bates et al. | |
| 2004/0243942 A1 | 12/2004 | Cortright | |
| 2004/0263475 A1 | 12/2004 | Wecker et al. | |
| 2005/0005248 A1 | 1/2005 | Rockey et al. | |
| 2005/0015462 A1* | 1/2005 | Lee et al. | 709/217 |
| 2005/0039141 A1 | 2/2005 | Burke et al. | |
| 2005/0086304 A1 | 4/2005 | Naick et al. | |
| 2005/0102629 A1 | 5/2005 | Chen et al. | |
| 2005/0108052 A1 | 5/2005 | Omaboe | |
| 2005/0125741 A1 | 6/2005 | Clow et al. | |
| 2005/0132296 A1 | 6/2005 | Milic-Frayling | |
| 2005/0160434 A1 | 7/2005 | Tan | |
| 2005/0240902 A1 | 10/2005 | Bunker et al. | |
| 2006/0036568 A1 | 2/2006 | Moore et al. | |
| 2006/0036945 A1 | 2/2006 | Radtke et al. | |
| 2006/0041891 A1 | 2/2006 | Aaron | |
| 2006/0069990 A1 | 3/2006 | Yozell-Epstein et al. | |
| 2006/0074869 A1 | 4/2006 | Rosenberg et al. | |
| 2006/0085741 A1 | 4/2006 | Weiner et al. | |
| 2006/0095343 A1 | 5/2006 | Clarke et al. | |
| 2006/0101046 A1 | 5/2006 | Hargarten et al. | |
| 2006/0112141 A1 | 5/2006 | Morris | |
| 2006/0143568 A1 | 6/2006 | Milener | |
| 2006/0179440 A1 | 8/2006 | Besbris | |
| 2006/0184890 A1 | 8/2006 | Altenhofen | |
| 2006/0200780 A1 | 9/2006 | Iwema et al. | |
| 2006/0206559 A1* | 9/2006 | Xie et al. | 709/201 |
| 2006/0206567 A1* | 9/2006 | Milligan et al. | 709/206 |
| 2006/0212593 A1* | 9/2006 | Patrick et al. | 709/230 |
| 2006/0218086 A1 | 9/2006 | Campbell et al. | |
| 2006/0230068 A1 | 10/2006 | Coulombe | |
| 2006/0271858 A1 | 11/2006 | Yolleck et al. | |
| 2007/0016573 A1 | 1/2007 | Nanavati | |
| 2007/0044086 A1 | 2/2007 | Sampath | |
| 2007/0079250 A1 | 4/2007 | Bump et al. | |
| 2007/0100650 A1 | 5/2007 | Ramer et al. | |
| 2007/0106952 A1 | 5/2007 | Matas et al. | |
| 2007/0106956 A1 | 5/2007 | Platt | |
| 2007/0150546 A1 | 6/2007 | Karakashian | |
| 2007/0168926 A1 | 7/2007 | Rajah | |
| 2007/0174420 A1* | 7/2007 | Khusial et al. | 709/217 |
| 2007/0226614 A1 | 9/2007 | Lorenzen et al. | |
| 2007/0229861 A1 | 10/2007 | Forbush et al. | |
| 2007/0255689 A1 | 11/2007 | Sun et al. | |
| 2007/0280206 A1* | 12/2007 | Messer et al. | 370/352 |
| 2007/0282879 A1* | 12/2007 | Degenkolb et al. | 707/101 |
| 2008/0022229 A1* | 1/2008 | Bhumkar et al. | 715/838 |
| 2008/0092171 A1 | 4/2008 | Roberts et al. | |
| 2008/0098085 A1* | 4/2008 | Krane et al. | 709/217 |
| 2008/0134093 A1 | 6/2008 | Dharmarajan et al. | |
| 2008/0195628 A1 | 8/2008 | Kim | |
| 2008/0214153 A1* | 9/2008 | Ramer et al. | 455/414.1 |
| 2008/0228924 A1 | 9/2008 | Herberger et al. | |
| 2008/0307385 A1* | 12/2008 | Dreiling et al. | 717/108 |
| 2009/0024953 A1 | 1/2009 | Selig | |
| 2009/0063415 A1 | 3/2009 | Chatfield et al. | |
| 2009/0083289 A1 | 3/2009 | Morris | |
| 2009/0083618 A1 | 3/2009 | Campbell | |
| 2009/0100342 A1 | 4/2009 | Jakobson | |
| 2009/0150910 A1 | 6/2009 | Lyndersay | |
| 2009/0228804 A1 | 9/2009 | Kim | |
| 2009/0256558 A1 | 10/2009 | Fujita et al. | |
| 2009/0259969 A1 | 10/2009 | Pallakoff | |
| 2009/0282361 A1 | 11/2009 | Cortright | |
| 2009/0286558 A1 | 11/2009 | Zufi et al. | |
| 2009/0298490 A9 | 12/2009 | Janik | |
| 2009/0309849 A1 | 12/2009 | Iwema et al. | |
| 2009/0319680 A1 | 12/2009 | Owen et al. | |
| 2010/0069035 A1 | 3/2010 | Johnson | |
| 2010/0174713 A1 | 7/2010 | Baessler et al. | |
| 2010/0179876 A1 | 7/2010 | Holte | |
| 2010/0192098 A1 | 7/2010 | Kim | |
| 2010/0332325 A1 | 12/2010 | Holte | |
| 2011/0078232 A1 | 3/2011 | Van Den Driessche | |
| 2011/0193780 A1 | 8/2011 | Schaaf | |
| 2012/0190386 A1 | 7/2012 | Anderson | |

OTHER PUBLICATIONS

"Enhance your Web Browsing Experience!", Retrieved from <http://www.crazybrowser.com/> on Dec. 12, 2007., pp. 1-2.

"Final Office Action", U.S. Appl. No. 12/042,333, (May 26, 2011), 13 pages.

"Foreign Office Action", Chinese Application No. 200980107880.X, (Aug. 12, 2011), 9 pages.

"Microsoft Office Word 2003 Screenshots", Microsoft Corporation 1983-2003, (2003), 2 pages.

"Non-Final Office Action", U.S. Appl. No. 11/953,835, (Apr. 5, 2011), 20 pages.

"Non-Final Office Action", U.S. Appl. No. 12/042,333, (Dec. 9, 2010), 9 pages.

"Non-Final Office Action", U.S. Appl. No. 12/042,333, (May 9, 2012), 13 pages.

"Notice of Allowance", U.S. Appl. No. 11/953,835, (Nov. 17, 2011), 16 pages.

"PCT Search Report and Written Opinion", Application No. PCT/US2009/034122, (Sep. 28, 2009), 11 pages.

"Slim Browser", Retrieved from http://www.flashpeak.com/sbrowser/ on Dec. 12, 2007., 2 Pages.

Almaer, Dion "Tooltip.js: Creating Simple Tooltips", Retrieved from: <http://ajazian.com/archives/tooltipsjs-creating-simple-tooltips> on May 19, 2011, (Nov. 29, 2005), 14 pages.

Chavez, Joe "Multi-tier Internet Architecture with Java, UML and OOA&D", *Astronomical Data Analysis Software and Systems IX, ASP Conference Series*, vol. 216 (2000), pp. 75-78.

Ferguson, D. F., et al., "Service-Oriented Architecture: Programming Model and Product Architecture", Retrieved from: <http://www.research.ibm.com/journal/sj/444/ferguson.html> on Oct. 9, 2007, IBM Systems Journal, (Oct. 21, 2005), 23 pages.

Galli, Marcio et al., "Inner-Browsing: Extending Web Browsing the Navigation Paradigm", Retrieved from: <http://devedge-temp.mozilla.org/viewsource/2003/inner-browsing/index_en.html> on Dec. 12, 2007, (May 16, 2003), 6 Pages.

Huffman, Lee "New Climate Area Released", Retrieved from: <http://blogs.hamweather.com> on May 19, 2011, (Feb. 2008), 3 pages.

(56) References Cited

OTHER PUBLICATIONS

Sheng, Quan Z., et al., "Self-Serv: A Platform for Rapid Composition of Web Services in a Peer-to-Peer Environment", *Proceedings of the 28th VLDB Conference*, Available at <http://eprints.qut.edu.au/archive/00000586/01/dumas_self-serv.pdf>,(2002),4 pages.

"Final Office Action", U.S. Appl. No. 12/042,333, (Oct. 16, 2012), 15 pages.

"Accelerators in Internet Explorer 8 Beta 2", Retrieved from <http://www.code-magazine.com/Article.aspx?quickid=0811062> on Dec. 1, 2008, pp. 1-5.

Garrett "Ajax: A New Approach to Web Applications", Retrieved from: <http://www.adaptivepath.com/ideas/essays/archives/000385.php> on Nov. 28, 2008., Feb. 18, 2005, 6 Pages.

"Filename extension", Retrieved from <http://web.archive.org/web/20071202041958/http://en.wikipedia.org/wiki/Filename_extension> on Jan. 27, 2013, Dec. 1, 2007, 7 pages.

"Final Office Action", U.S. Appl. No. 12/362,314, Jan. 5, 2012, 26 pages.

"Final Office Action", U.S. Appl. No. 12/362,314, Feb. 22, 2013, 36 pages.

"Non-Final Office Action", U.S. Appl. No. 12/362,314, Jul. 7, 2011, 18 pages.

"Non-Final Office Action", U.S. Appl. No. 12/362,314, Oct. 15, 2012, 34 pages.

"Non-Final Office Action", U.S. Appl. No. 12/362,314, Jul. 18, 2013, 41 pages.

"What's New for IE8 Search", Retrieved from http://blogs.msdn.com/ie/Default.aspx?p=2 on Dec. 1, 2008., 34 Pages.

"Extended European Search Report", EP Application No. 09716904.9, Sep. 17, 2012, 6 pages.

"Foreign Office Action", CN Application No. 200980107880.X, Jan. 16, 2014, 14 Pages.

"Foreign Office Action", CN Application No. 200980107880.X, Jan. 30, 2013, 15 pages.

"Foreign Office Action", CN Application No. 200980107880.X, Jun. 18, 2013, 14 pages.

"Foreign Office Action", CN Application No. 200980107880.X, Jul. 3, 2012, 12 pages.

"Foreign Office Action", EP Application No. 09716904.9, Jun. 21, 2013, 6 Pages.

"Foreign Office Action", JP Application No. 2010-549700, Feb. 20, 2013, 6 pages.

"Foreign Office Action", JP Application No. 2010-549700, Jul. 25, 2014, 34 pages.

"Foreign Office Action", JP Application No. 2010-549700, Nov. 12, 2012, 8 pages.

"Intent to Grant", EP Application No. 09716904.9, Jun. 17, 2014, 13 Pages.

"Summons to Attend Oral Proceedings", EP Application No. 09716904.9, Jan. 31, 2014, 9 pages.

"Final Office Action", U.S. Appl. No. 12/042,333, May 4, 2015, 13 pages.

"Non-Final Office Action", U.S. Appl. No. 12/042,333, Oct. 5, 2015, 13 pages.

"Final Office Action", U.S. Appl. No. 12/042,333, Jun. 13, 2016, 17 pages.

"Non-Final Office Action", U.S. Appl. No. 12/042,333, Nov. 17, 2014, 11 pages.

"Foreign Office Action", JP Application No. 2010-549700, Oct. 30, 2013, 6 pages.

\* cited by examiner

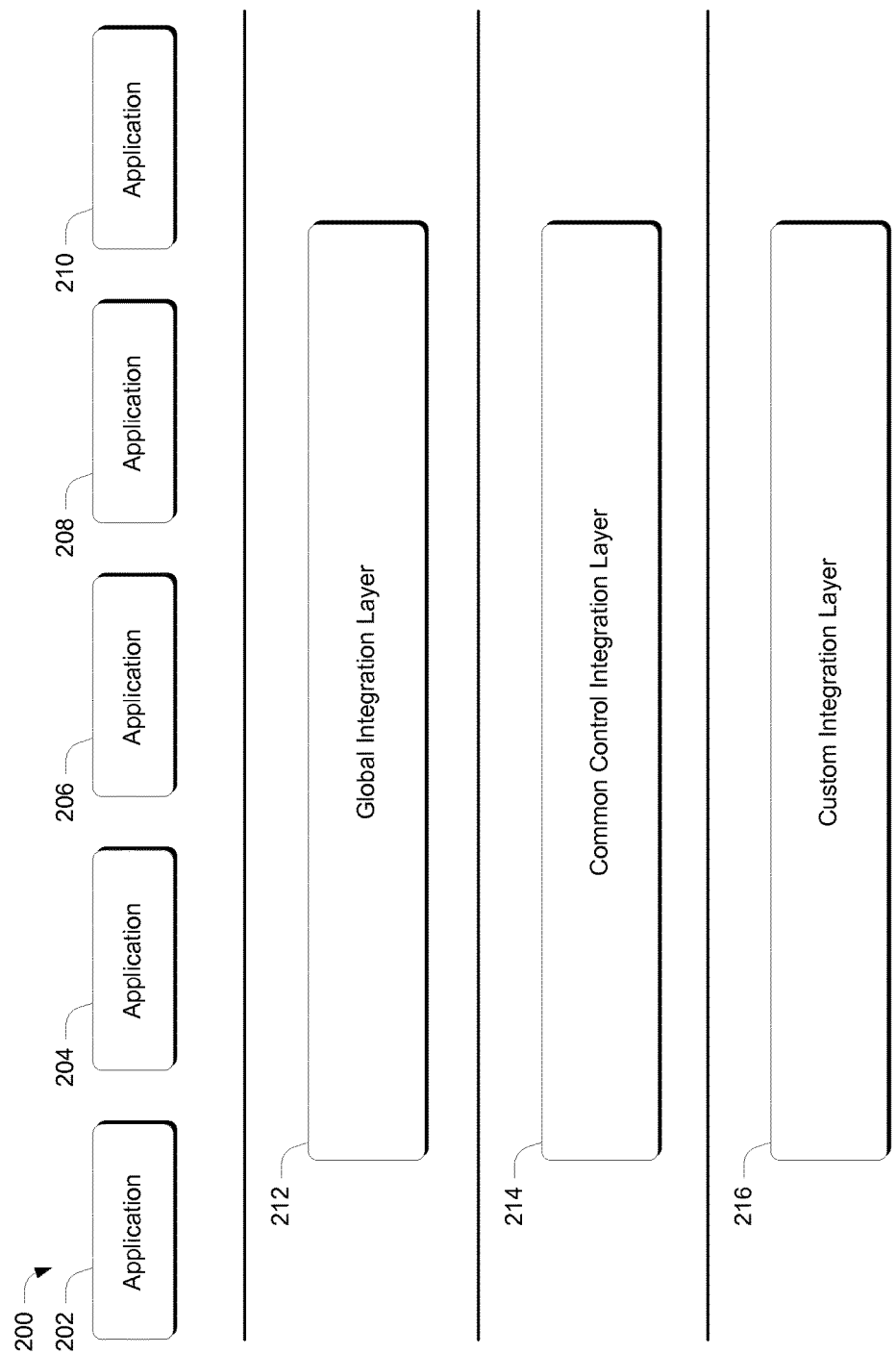

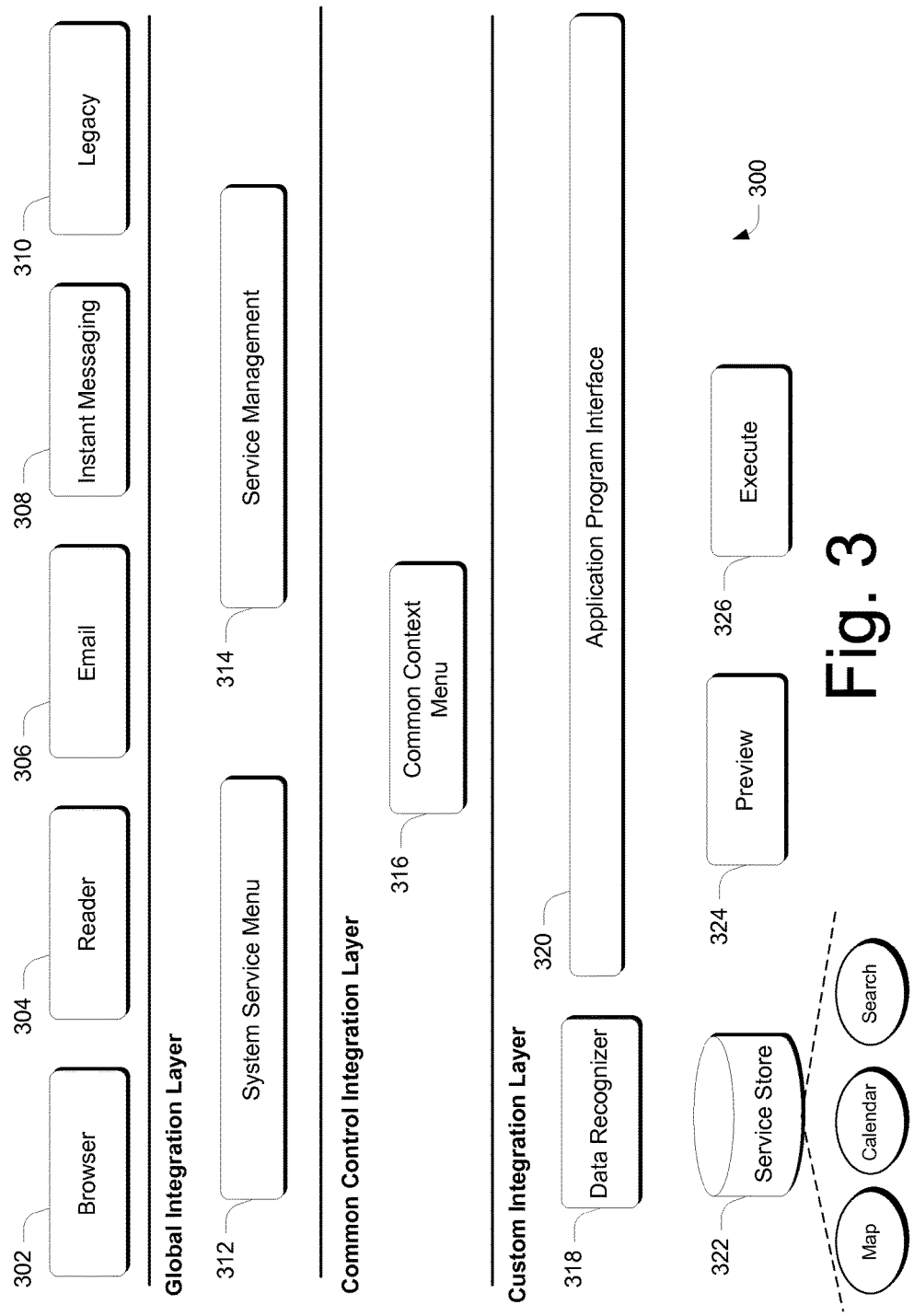

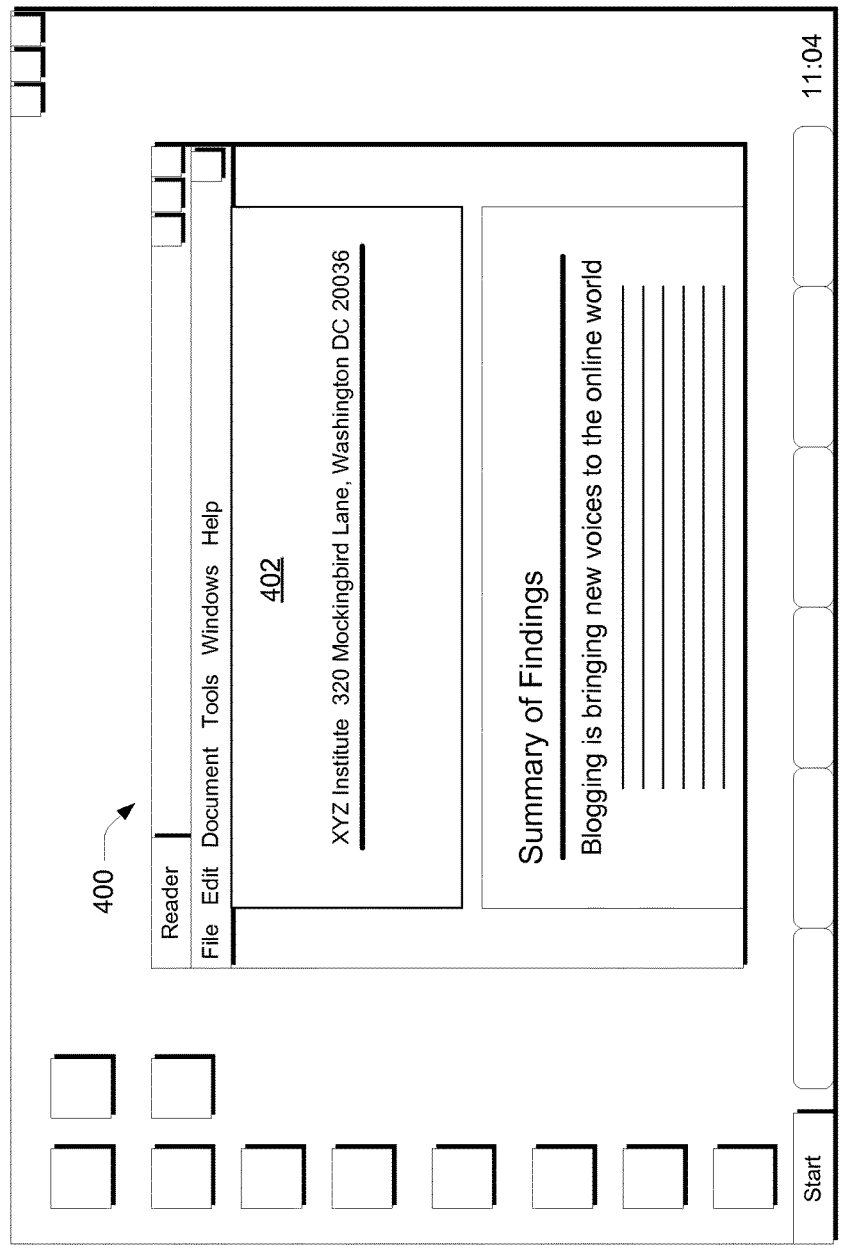

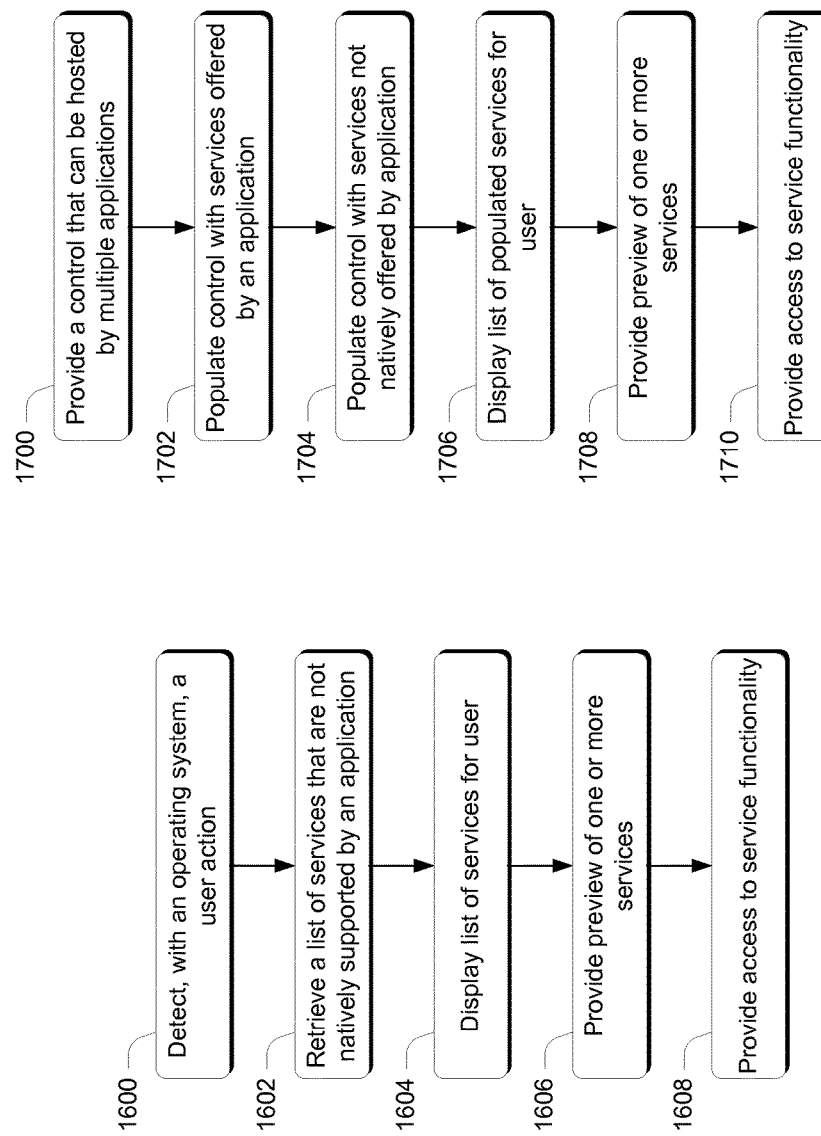

SERVICE PLATFORM FOR IN-CONTEXT RESULTS

RELATED APPLICATIONS

This application is a continuation of and claims priority to U.S. patent application Ser. No. 11/953,835, filed Dec. 10, 2007, entitled "Service Platform for In-Context Results", the disclosure of which is incorporated in its entirety by reference herein.

BACKGROUND

To date, integrating services such as web services and local services with client applications has been a challenging task. Challenges are posed not only from the standpoint of easing integration with client applications, but also exposing services in a graceful, consistent way. These challenges have resulted in complex coding scenarios as well as inconsistent user experiences which, in turn, can lead to dissatisfaction on the part of users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a service platform that integrates services, such as web services and/or local services, across a variety of applications. In at least some embodiments, services can be integrated with legacy applications that are "unaware" of such services, as well as applications that are aware of such services.

In at least some embodiments, the platform comprises a multi-layered structure designed to integrate services across a variety of applications. The multi-layered structure includes, in at least some embodiments, a global integration layer that is designed to integrate services with legacy applications, as well as a common control integration layer and a custom integration layer. The common control integration layer can be used to provide a common control that can be used across applications to integrate not only services of which the applications are aware, but services of which the applications are not aware. The custom integration layer can be used by various applications to customize user interfaces that are designed to integrate various offered services.

BRIEF DESCRIPTION OF THE DRAWINGS

The same numbers are used throughout the drawings to reference like features.

FIG. 2 illustrates a system having a multi-layered service platform in accordance with one or more embodiments.

FIG. 3 illustrates an example system having a multi-layered service platform in accordance with one or more embodiments.

FIG. 4 illustrates a user interface in accordance with one or more embodiments.

FIG. 16 is a flow diagram that describes steps in a method in accordance with one or more embodiments.

FIG. 17 is a flow diagram that describes steps in a method in accordance with one or more embodiments.

DETAILED DESCRIPTION

Overview

Various embodiments provide a service platform that integrates services, such as web services and/or local services, across a variety of applications. In at least some embodiments, services can be integrated with legacy applications that are "unaware" of such services, as well as applications that are aware of such services. Services can include, by way of example and not limitation, any of a variety of services such as search services, definition services, investigation services, mapping services, news services, image services, translation services and the like. In one or more embodiments, the service platform is extensible to provide for integration of new or changed services in a seamless manner across a variety of applications.

In at least some embodiments, the platform comprises a multi-layered structure designed to integrate services across a variety of applications. The multi-layered structure includes, in at least some embodiments, a global integration layer that is designed to integrate services with legacy applications, as well as a common control integration layer and a custom integration layer. The common control integration layer can be used to provide a common control that can be used across applications to integrate not only services of which the applications are aware, but services of which the applications are not aware. The custom integration layer can be used by various applications to customize user interfaces that are designed to integrate various offered services.

In the discussion that follows, a section entitled "Operating Environment" is provided and describes one environment in which one or more embodiments can be employed. Following this, a section entitled "Example Multi-layered Service Platform" is provided and describes a multi-layered platform in accordance with one or more embodiments.

Next, a section entitled "Implementation Example" describes an example implementation of a multi-layered service platform. Next, a section entitled "Declarative Model" is provided and describes an example declarative model that can be used to enable service providers to describe services that are offered. Following this, sections entitled "Global Integration Layer—User Interface Example", "Common Control Integration Layer—User Interface Example", and "Custom Integration Layer—User Interface Example" each respectively provide examples of user interfaces in accordance with one or more embodiments. Next, a section entitled "Example Methods" describes example methods in accordance with one or more embodiments. A section entitled "Example APIs" gives a description of a set of APIs in accordance with one or more embodiments. Finally, a section entitled "Example System" describes an example system that can be utilized to implemented one or more embodiments.

Operating Environment

Figure 1:
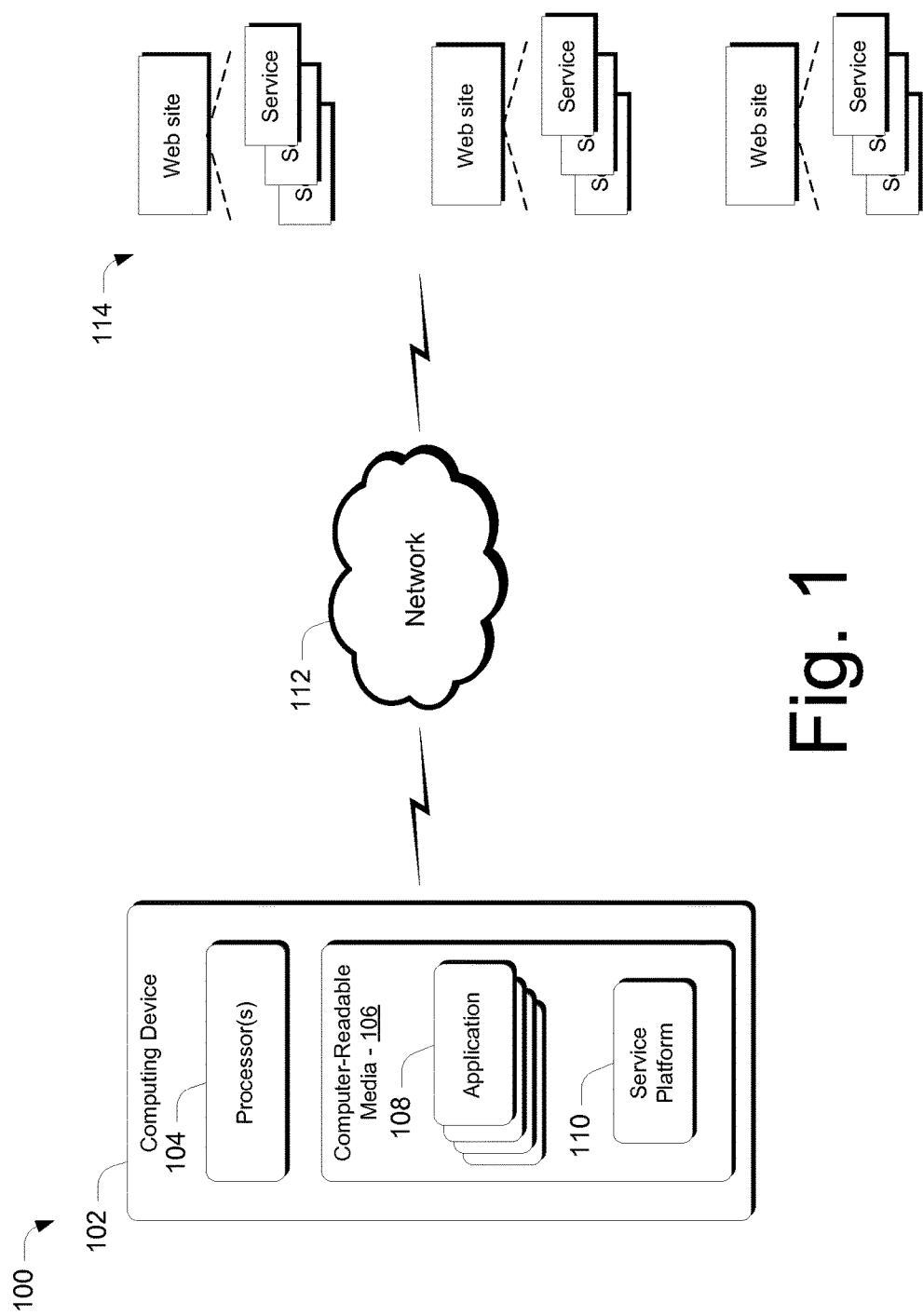
FIG. 1 illustrates a system in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). Applications 108 can include any suitable type of application such as, by way of example and not limitation, browser applications, reader applications, e-mail applications, instant messaging applications, and a variety of other applications. The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 19.

In addition, computing device 102 includes a service platform 110. The service platform is designed to integrate services, such as web services and/or local services, across a variety of applications such as those mentioned above and others. In at least some embodiments, services can be integrated with legacy applications that are "unaware" of such services, as well as applications that are aware of such services as will become apparent below. As indicated in the figure, the service platform resides in the form of computer-readable instructions or code that resides on computer-readable media 106.

In addition, environment 100 includes a network 112, such as the Internet, and one or more web sites 114 from and to which content can be received and sent. Websites 114 can offer a variety of services that can be integrated by service platform 110, as will become apparent below.

Computing device 102 can be embodied as any suitable computing device such as, by way of example and not limitation, a desktop computer, a portable computer, a handheld computer such as a personal digital assistant (PDA), cell phone, and the like.

Example Multi-Layered Service Platform

FIG. 2 illustrates a system having a multi-layered service platform in accordance with one or more embodiments, generally at 200. In this example, system 200 includes multiple different applications 202, 204, 206, 208, and 210. The applications can comprise a variety of applications examples of which are provided above and below. In addition, system 200 includes, in this example, multiple different platform layers that are designed to integrate services, both web services and/or local services, across a variety of applications such as applications 202-210. In this particular example, the multiple different layers include a global integration layer 212, a common control integration layer 214, and a custom integration layer 216.

In the illustrated and described embodiment, the global integration layer 212 is designed to enable applications that are not "service aware" to nonetheless allow a user to access and use such services from within the applications. To this end, in at least some embodiments, the global integration layer provides a generic user interface that displays one or more services that are available and which can be invoked from within an application. In this embodiment, functionality of the global integration layer is supported by an operating system operating on a local client device. When a user wishes to ascertain which services are available from within an application that is not service aware, the user can take a particular action, such as using a shortcut on the operating system desktop (e.g. keying a hot key combination) which is detected by the operating system. Responsive to detecting the user action, the operating system can make an API call to a local service store to receive a listing of services that are available. The operating system can then present a generic user interface that lists the available services for the user.

In one or more embodiments, once the generic user interface has been presented to the user, the user can take a number of different actions. For example, in some embodiments, the user can hover their cursor over a particular service description or icon and receive a preview of that service. Alternately or additionally, a user can click on a particular service description or icon and then be navigated to that service's functionality. Navigation to a particular service's functionality can include a local navigation or a web-based navigation. In one or more embodiments, navigation can include sending data, such as that selected by a user, to the service for operation by the service.

Thus, in this embodiment, the generic user interface which is provided by the operating system is knowledgeable of the particular API calls that are used to present available services and to enable users to select one or more of the services. In this manner, applications that are not "service aware" can still be used as a starting point for a user to access services.

In the illustrated and described embodiment, the common control integration layer 214 provides a control that can be hosted by one or more applications. The control can allow applications to populate those services that the applications natively support, as well as to provide a means by which services which are not natively supported by the applications can nonetheless be offered to a user. When a user wishes to ascertain which services are available from within an application, the user can take a particular action such as making a particular selection, such as a text selection or file selection. Responsive to detecting the user action, the hosted control can make an API call to a local service store to receive a listing of services that are available. The control can then present a user interface that lists the available services for the user. These services can include services that are offered by the application natively, as well as services that are offered by other service providers either locally or remotely.

In one or more embodiments, once the user interface has been presented to the user, the user can take a number of different actions. For example, in some embodiments, the user can hover their cursor over a particular service description or icon and receive a preview of that service. Alternately or additionally, a user can click on a particular service description or icon and then be navigated to that service's functionality. Navigation to a particular service's functionality can include a local navigation or a web-based navigation.

Thus, in this embodiment, the control is knowledgeable of the particular API calls that are used to present available services and to enable users to select one or more of the services. In this manner, applications can use the control to both offer services natively and provide services offered by other service providers. In addition, as the control can be hosted by many different applications, a common user experience can be provided across a variety of applications.

In one or more embodiments, the custom integration layer 216 provides a set of APIs that can be used by applications that are aware of the APIs to receive a list of offered services and then create their own user interface and user experience through which a user can consume the offered services.

Having described the general notion of a multi-layered service platform, consider now an implementation example that describes one specific instance of a multi-layered service platform. It is to be appreciated and understood that the following description provides but one example, and is not to be used to limit application of the claimed subject matter to a specific implementation. Accordingly, other implementations can be utilized without departing from the spirit and scope of the claimed subject matter.

Implementation Example

Figure 3A:
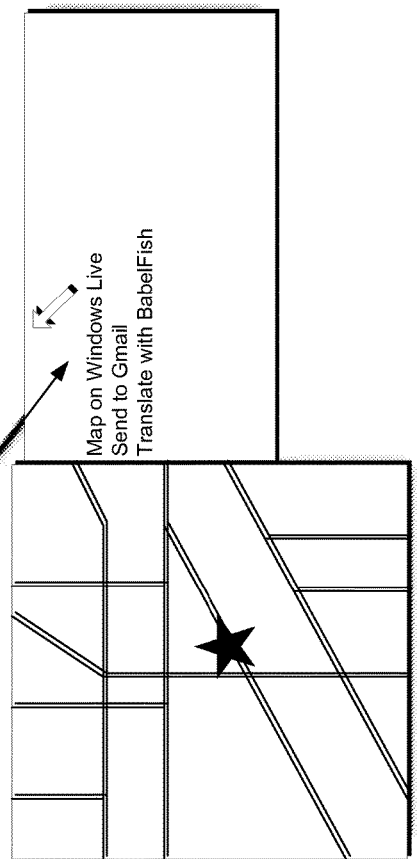
FIG. 3a, illustrates aspects of a declarative model in accordance with one or more embodiments.

FIG. 3 illustrates an example system having a multi-layered service platform in accordance with one or more embodiments, generally at 300. In this example, system 300 includes applications in the form of a Web browser 302, a reader application 304, an e-mail application 306, an instant messaging application 308, and one or more so-called legacy applications 310. In the context of this document, a legacy application can be considered as an application that is not aware of at least some of the services that a user can access while using the application. The illustrated applications are provided for example only and are not intended to limit application of the claimed subject matter. Accordingly, other applications can be used without departing from the spirit and scope of the claimed subject matter.

In this particular example, a global integration layer includes a system service menu 312 and a service management component 314, and a common control integration layer includes a common context menu 316. Further, in one or more embodiments, a custom integration layer includes a data recognizer component 318, an application program interface or API 320, a service store 322, a preview component 324, and an execute component 326.

In one or more embodiments, the system service menu 312 of the global integration layer can be invoked by a user while using one or more applications and with context provided by the application(s). In practice, applications that are not "service aware" can be used to invoke the system service menu. In one or more embodiments, the system service menu is supported by the client device's operating system and can be invoked in any suitable way. For example, in at least some embodiments, a user can access the system service menu by keying in a particular hot key combination. Once detected by the operating system, the hot key combination results in an API call to application program interface 320 to receive a list of available services. The available services can be services that are offered locally and/or services that are offered by remote service providers. System service menu 312 then presents a user interface that lists the available services that can be accessed by the user. In one or more embodiments, the user interface presented by the system service menu 312 is generic across a variety of applications, thus offering an integrated, unified user experience.

Once the services are listed for the user via the user interface presented by the system service menu 312, the user may choose a particular service. In one or more embodiments, a user can receive a preview of a service, via a preview component 324 by taking some action with respect to a displayed service. For example, a user may hover their cursor over or near a particular description or icon associated with the service and receive the preview of that service. In one or more embodiments, previews can be provided for the user without the user having to leave the context of their application. When the user hovers their cursor in this manner, the operating system can make an API call to the preview component 324 to receive information or data that is to be presented as part of the preview. Alternately or additionally, by clicking on a particular service description or icon, a user can cause the service to execute. When this happens, the operating system can make an API call to the execute component 326 which, in turn, can cause the service to execute. Execution of the service can include, by way of example and not limitation, a navigation activity which can be either or both of a local navigation or a remote navigation. Examples of how this can be done are provided below.

In one or more embodiments, service management component 314 provides various management functionalities associated with services. For example, in one or more embodiments, the service management component 314 can provide functionality that enables a user to add, delete, and/or update the particular service. Further, in one or more embodiments, the service management component can enable a user to set a particular service as a default service for easy access.

In one or more embodiments, the common context menu 316 of the common control integration layer provides a common context menu across a variety of applications. In one or more embodiments, the common context menu is a control that can be hosted by a variety of applications. In at least some embodiments, these applications do not have to natively understand how a service or associated activity works. Yet, by hosting the control, the application can still offer the service as part of the application experience. When an application hosts the common context menu, the application can populate the menu with services it offers, as well as other services that are offered by other service providers. As such, an application can offer both native services as well as non-native services. In one or more embodiments, the common context menu is knowledgeable of the application program interface 320 and can make appropriate API calls to receive information on services that are offered and described in service store 322. Specifically, in one or more embodiments, the common context menu is aware of the particular service API.

In one or more embodiments, data recognizer 318 is configured to recognize data associated with particular API calls in which service listings are requested. Accordingly, the data recognizer 318 can then ensure that a proper set of services are returned to the caller. For example, if a user selects a particular portion of text, such as an address, then a particular subset of services may be inappropriate to return. In this case, the data recognizer 318 can see to it that a correct listing of services is returned.

In one or more embodiments, application program interface 320 provides a set of APIs that can be used to add, delete, or otherwise manage services that can be presented to the user. The APIs can include those that are used to receive a listing of services. But one example of the set of APIs is provided below in a section entitled "Example APIs".

In one or more embodiments, service store 322 is utilized to maintain information and/or data associated with different services that can be offered. Services can be flexibly added and deleted from the service store. This can be done in any suitable way. In one or more embodiments, this can be done through the use of a declarative model that service providers use to describe the services that they offer. One example of a declarative model is provided just below in a section entitled "Declarative Model". When a call is received by the application program interface 320, information associated with the call can be retrieved from the service store 322 and presented accordingly.

In one or more embodiments, the preview component 324 can be utilized to provide a preview of one or more offered services. An example of how this can be done is provided below.

In one or more embodiments, the execute component 326 can be utilized to execute one or more of the services that are offered. An example of how this can be done is provided below.

Declarative Model

In one or more embodiments, service providers can utilize a declarative model to describe services that are offered. In at least some embodiments, the declarative model utilizes an XML description to describe aspects of offered services. As an example, consider FIG. 3a. , There, an example XML excerpt is shown and describes aspects and other parameters associated with an offered service. By using a declarative model, a service can define how it uses data in a declarative manner.

Specifically, the XML description pertains to a mapping service. The XML description provides a homepage URL which is the homepage associated with the offered service. In addition, a <display> tag enables a service provider to provide a name that is then used in a preview display as shown. An <activity> tag contains information associated with the offered service. Specifically, in this example, the <activity> tag describes a category of service which, in this example, is a "map" service. An <activityAction> tag then describes context that can trigger the service, as well as behaviors that can be performed responsive to a triggering context.

Specifically, in this example, when a user makes a particular selection (i.e. context="selection"), a preview action can be performed. In this case, the user's selection is provided as a value parameter which is then sent to the URL listed in the <preview> tag. The recipient of the value parameter can then return content associated with a preview of the user's selection, such as the illustrated preview map. Likewise, if a user clicks on or otherwise selects the preview, their selection is provided to the URL listed in the <execute> tag and the user can be navigated to that URL to be exposed to further functionality provided by the service provider. In this example, if a user clicks on the preview map, they are navigated to the listed URL and one or more of the included parameters are used to provide driving directions to a particular address.

By using a declarative model as described above, services can be easily extended and/or modified by service providers. Specifically, service providers can continually modify and change their provided services and can simply update their declarative model for incorporation in the service platform.

In addition, this makes it easier for the system hosting these services to be more secure and provide a consistent experience.

Having now considered a system that implements a multi-layered service platform as well as an example declarative model, consider now a discussion of example user interfaces that can be employed in connection with the global integration layer, the common control integration layer, and the custom integration layer, each of which appears under its own heading.

Global Integration Layer—User Interface Example

FIG. 4 illustrates a user interface for a reader application generally at 400. In this example, a user has opened the reader application on their desktop and has opened, using the reader application, a document 402. In this example, the reader application does not natively support one or more services that are to be offered to the user.

Figure 5:
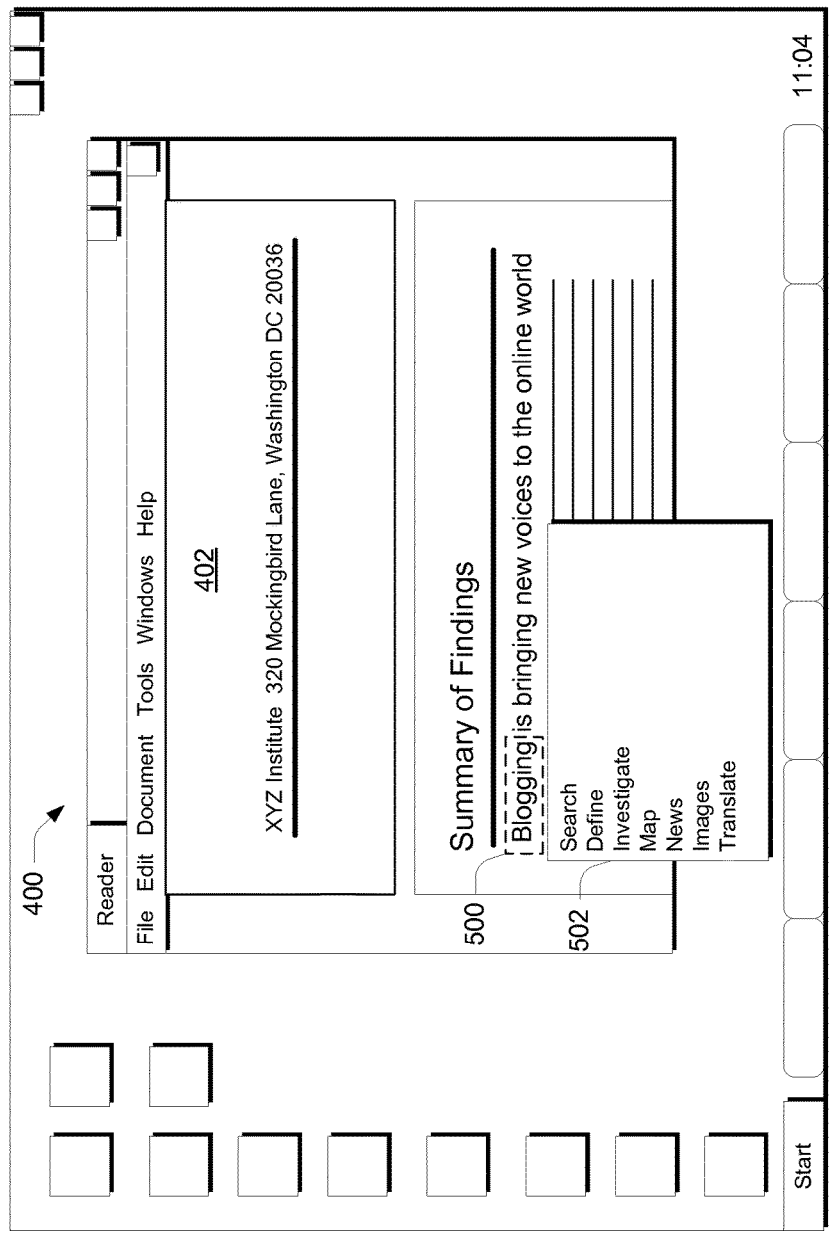
FIG. 5 illustrates a user interface in accordance with one or more embodiments.

Referring to FIG. 5, the user has selected the text "Blogging" with their cursor, indicated by the dashed box at 500. Responsive to this user action, the operating system has made an API call to application program interface 320 (FIG. 3) and responsively, presents a system service menu 502 which lists a number of available services. As shown, the services include by way of example and not limitation, a search service, a define service, an investigate service, a map service, a news service, an images service, and a translate service. In the illustrated and described embodiment, none of the listed services are natively supported by the reader application 400.

Figure 6:
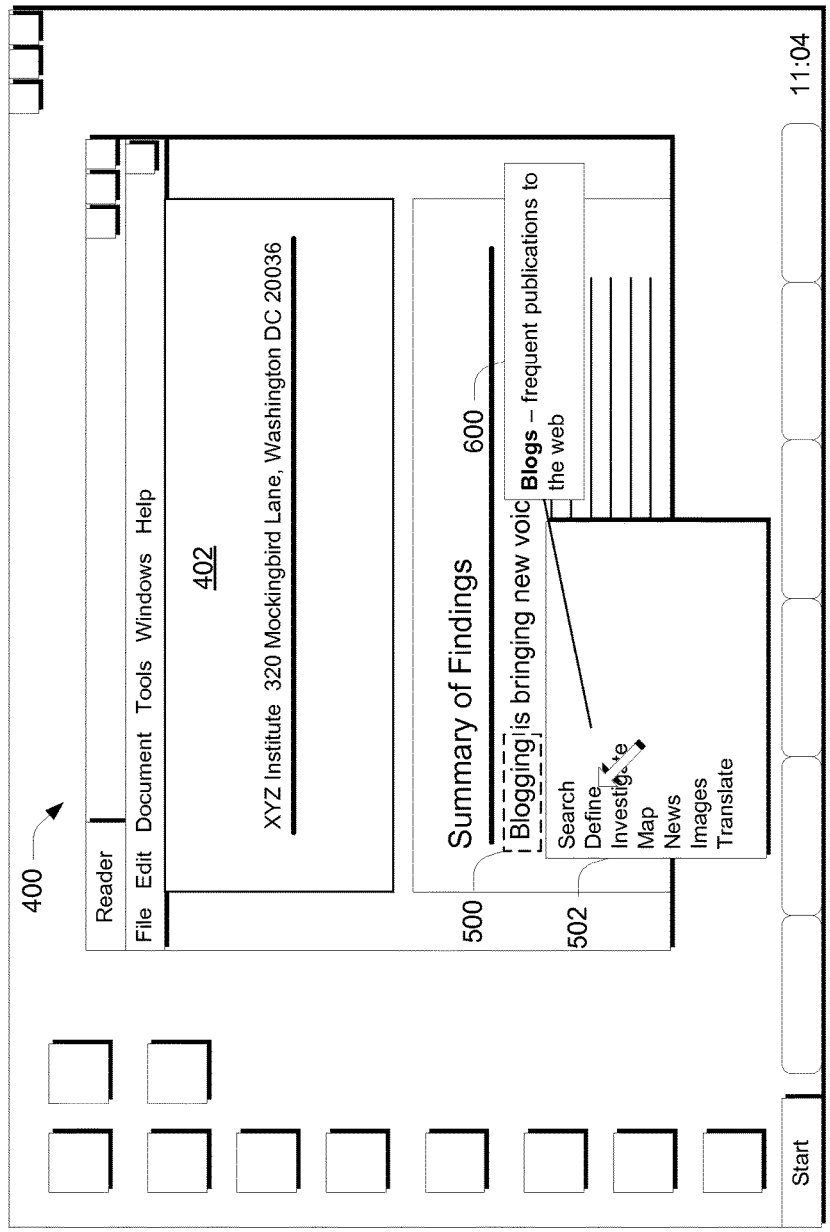
FIG. 6 illustrates a user interface in accordance with one or more embodiments.

Referring to FIG. 6, the user has hovered their cursor over or near the define service listing. Responsively, a preview 600 is presented for the user. In this particular example, the preview briefly defines the term that has been selected by the user. In this example, presentation of preview 600 is a result of an API call made by the operating system to the application program interface 320 (FIG. 3) in cooperation with preview component 324. In this particular example, the presented preview causes a navigation to a remote service provider which, in turn, provides the information displayed in the preview.

Figure 7:
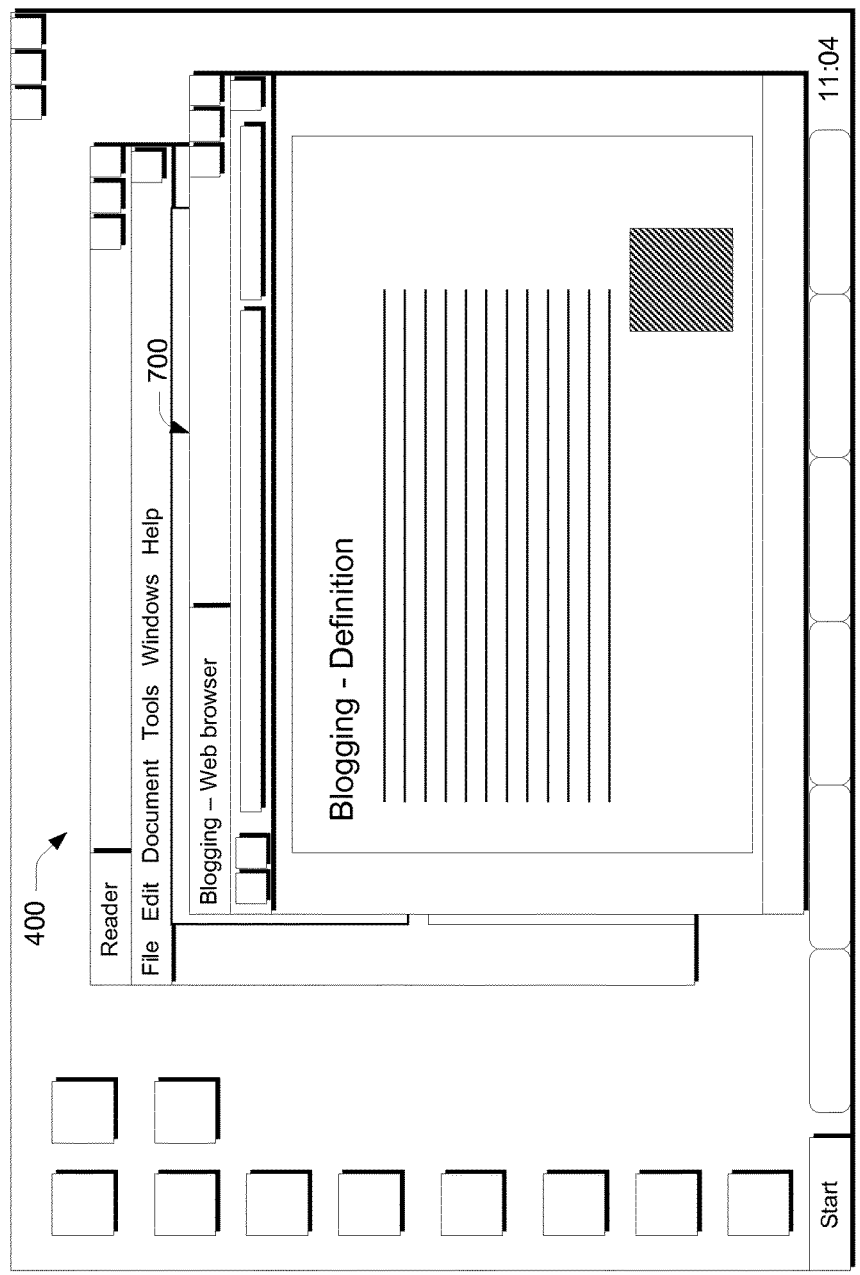
FIG. 7 illustrates a user interface in accordance with one or more embodiments.

At this point, the user may or may not choose to execute the service. If the user chooses to execute the service by, for example, clicking on the preview 600, a full navigation to a definition site can take place. For example, FIG. 7 illustrates a user interface 700 that is provided as a result of the navigation to a definition site. In this example, a full definition of the term selected by the user can be provided as well as other information provided by the definition site.

In this manner, an application that does not natively support a particular service can, nonetheless, through the support of the operating system, provide access to a number of services.

Figure 8:
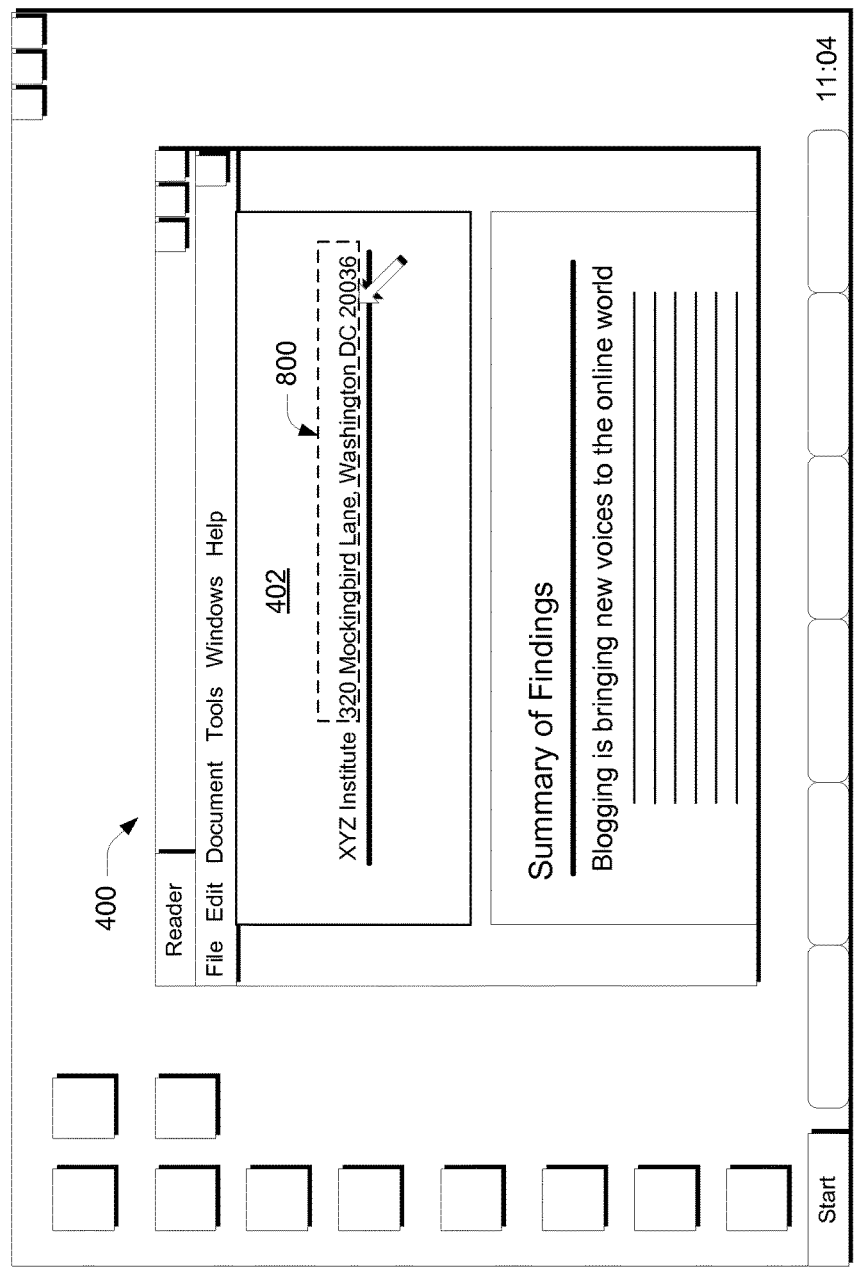
FIG. 8 illustrates a user interface in accordance with one or more embodiments.

As another example, consider FIG. 8. There, the reader application 400 and document 402 are shown. In this example, the user has selected, with their cursor, an address indicated by the dashed box at 800.

Figure 9:
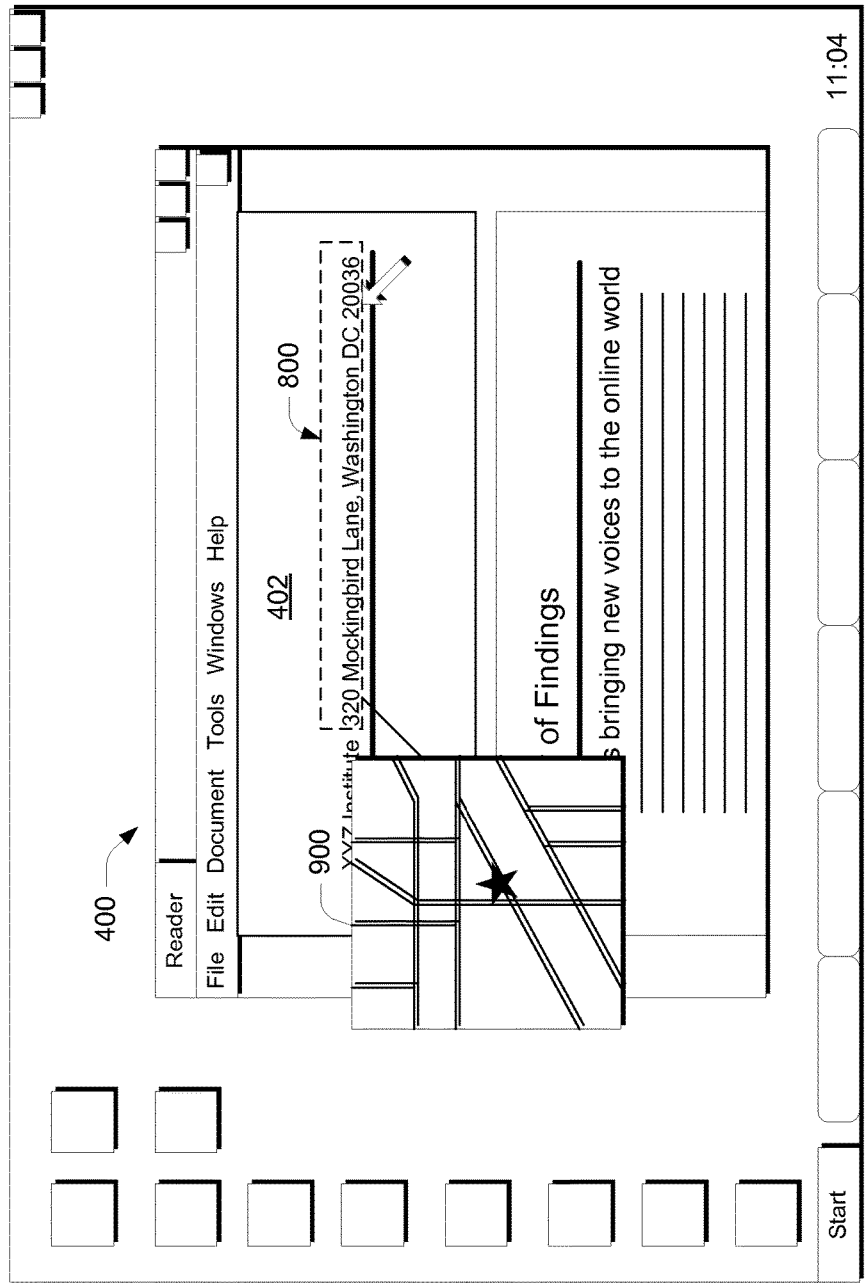
FIG. 9 illustrates a user interface in accordance with one or more embodiments.

Referring to FIG. 9, a preview in the form of a map user interface 900 has been presented to the user. By clicking on the preview, the user can be navigated to a map site that can, for example, provide the user with an option to receive driving directions to the particular address, as well as other functionality that is commonly provided at map sites.

Again, in this instance, a reader application that does not natively support a mapping service can nonetheless, through the support of the operating system, provide access to a mapping service.

Common Control Integration Layer—User Interface Example

Figure 10:
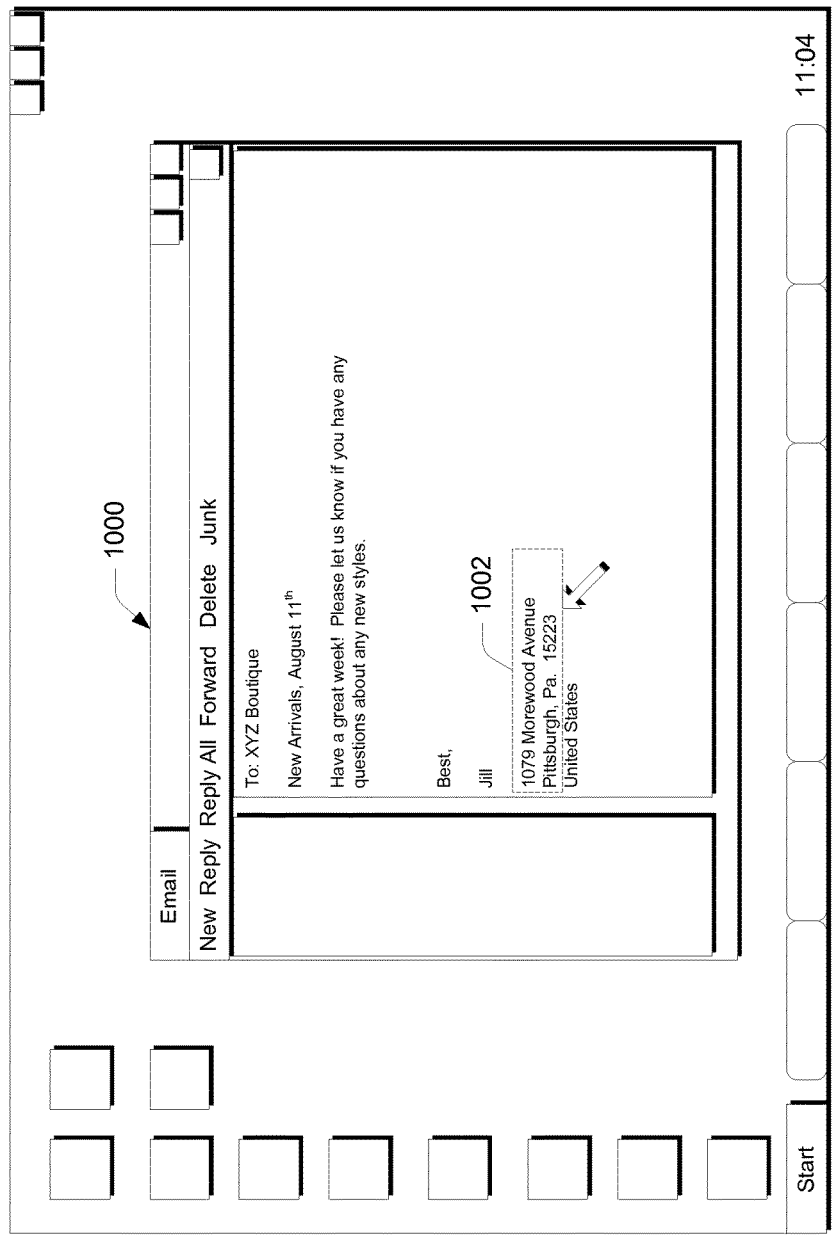
FIG. 10 illustrates a user interface in accordance with one or more embodiments.

In one or more embodiments, the common control integration layer can provide a common control that can be used by applications to expose services that can be accessed by an application. In one or more embodiments, the common control takes the form of a system service menu such as that provided by system service menu 312 (FIG. 3). As an example, consider FIG. 10 which illustrates a user interface provided by an email application generally at 1000. In this example, the user has selected an address indicated at 1002.

Figure 11:
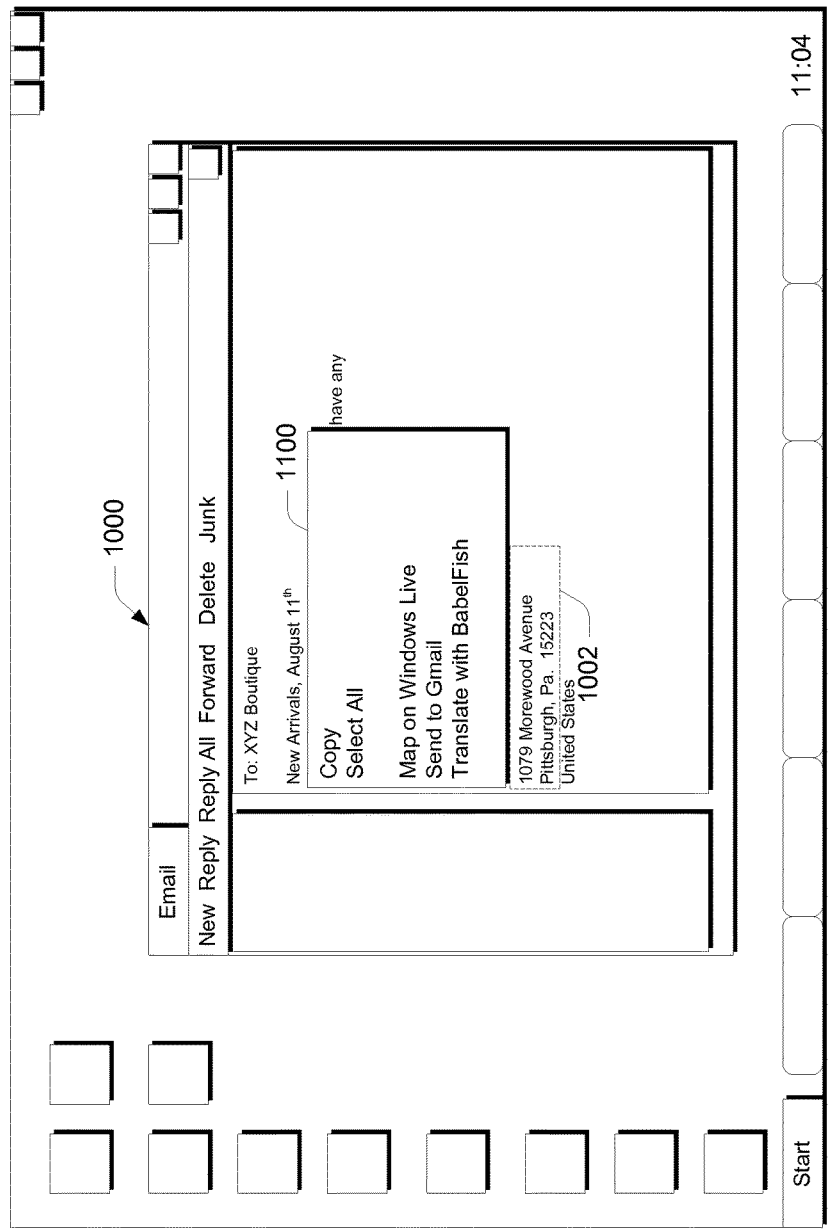
FIG. 11 illustrates a user interface in accordance with one or more embodiments.

Responsive to the user's selection, a common control can be presented which can display for the user not only services offered by the application, but services that are offered by other service providers. As an example, consider FIG. 11 which illustrates a common control 1100 that lists services offered by the application as well as services that are provided by other service providers. Specifically, in this example, services offered by the application include "Copy" services and "Select All" services. In addition, other services that are not natively offered by the application can be displayed as well. Specifically, in this example, such services include a "Map on Windows Live" service, a "Send to Gmail" service, and a "Translate with BabelFish" service. In this example, the services that are presented within common control 1100 are the result of an API call that has been made by the control.

Figure 12:
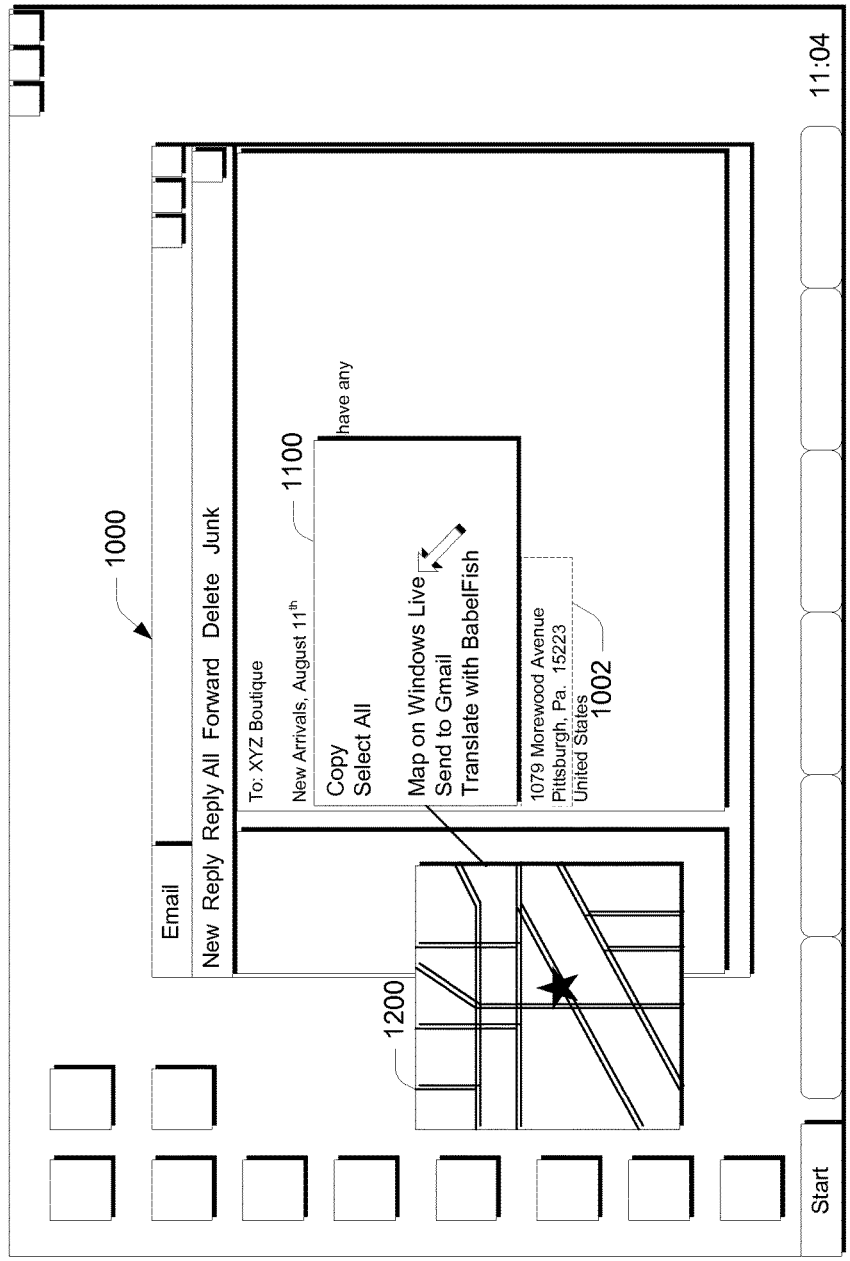
FIG. 12 illustrates a user interface in accordance with one or more embodiments.

Referring to FIG. 12, a user has hovered their cursor over or near the mapping service and, responsively, has been presented with a map preview 1200 which provides a preview of the service. Now, by clicking on the preview 1200, the user can be navigated to an associated mapping site that provides other mapping functionality as described above.

In this manner, a common control can be used across a variety of applications to enable services to be presented to a user that are natively supported by the application as well as those that are not natively supported by the application. Use of a common control across different applications provides a unified, integrated user experience.

Custom Integration Layer—User Interface Example

Figure 13:
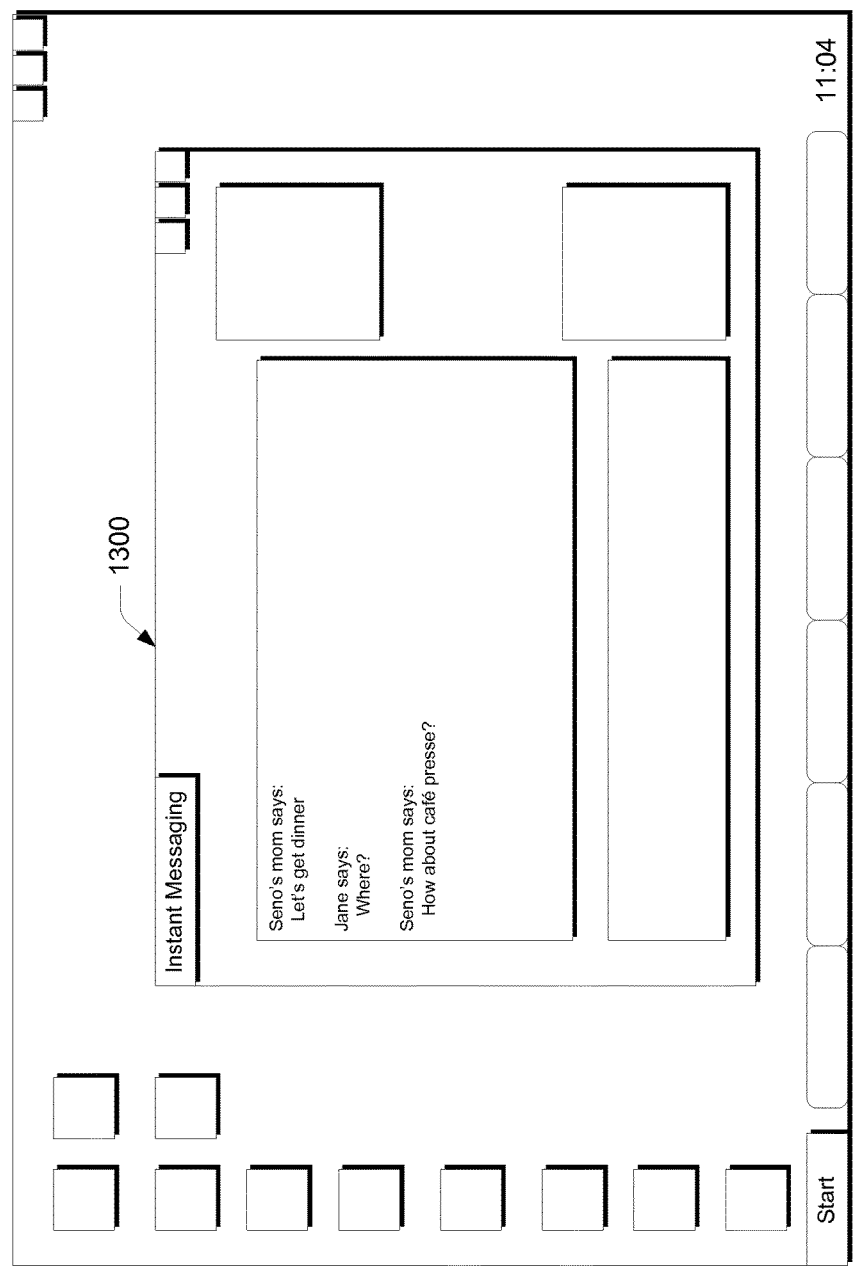
FIG. 13 illustrates a user interface in accordance with one or more embodiments.

In one or more embodiments, the custom integration layer provides a set of APIs that can be used by applications that are aware of the APIs to receive a list of offered services and then create their own user interface and user experience through which a user can consume the offered services. As an example, consider FIG. 13 which shows an application in the form of an instant messaging application having a user interface 1300. In this example, a user has entered into a dialogue with another person. The dialogue concerns where the participants would like to get dinner. One of the participants has mentioned a particular café.

Figure 14:
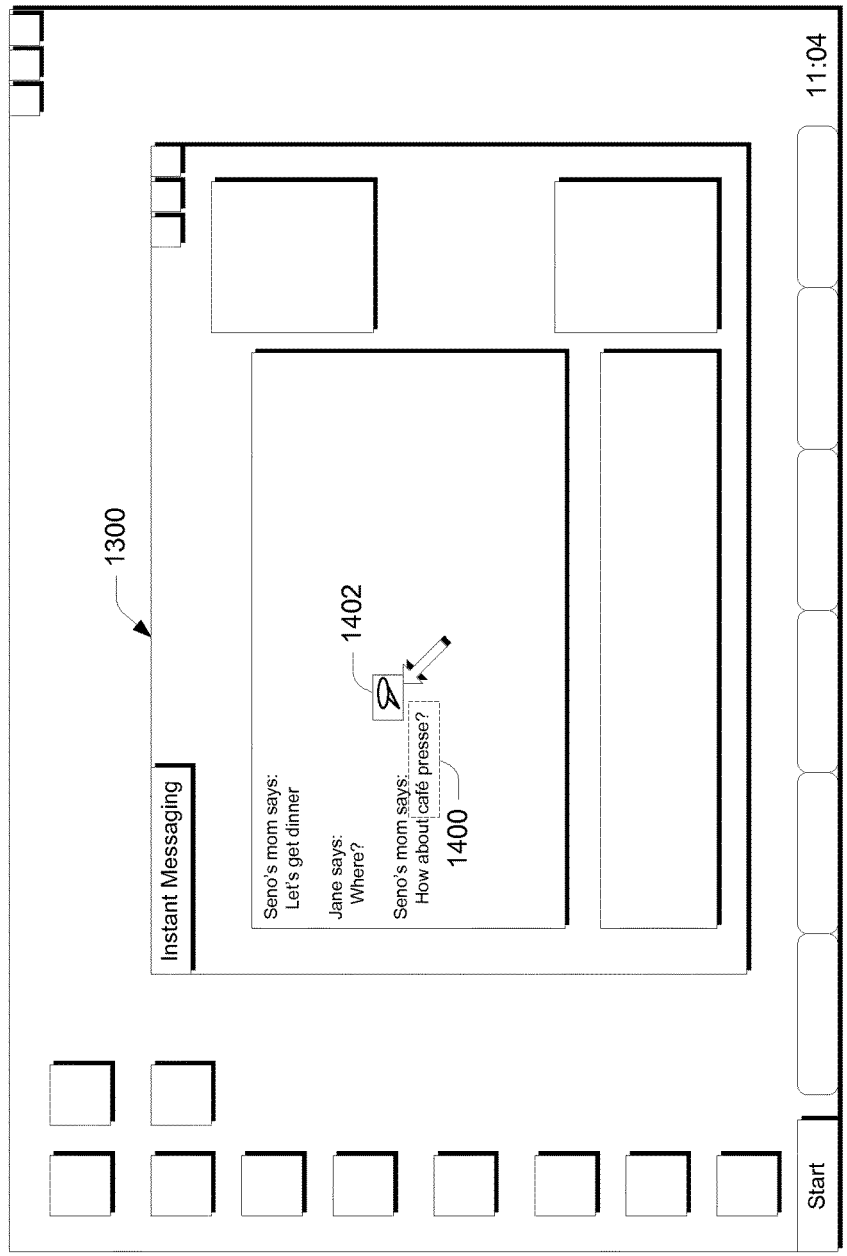
FIG. 14 illustrates a user interface in accordance with one or more embodiments.
Figure 15:
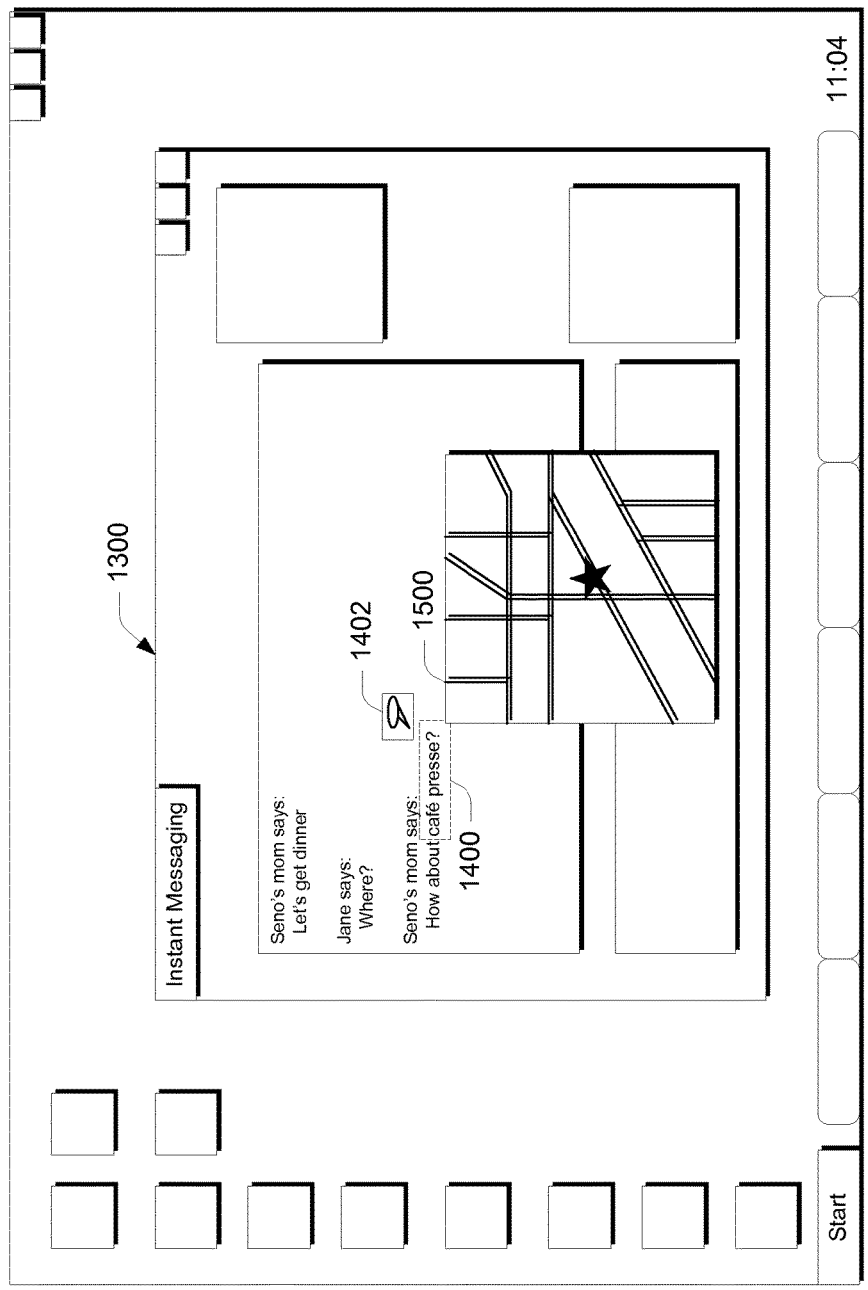
FIG. 15 illustrates a user interface in accordance with one or more embodiments.

Referring to FIG. 14, the user has selected the text "café presse" as indicated by the dashed box 1400. Responsive to detecting this text selection, the instant messaging application which, in this example, is aware of the platform's APIs, has made an API call to receive back a list of offered services. In this example, a mapping service is provided and is associated with the icon shown at 1402. By hovering their cursor on or near icon 1402, a user can receive a preview of the service as described above. As an example, consider FIG. 15. There, a preview in the form of a map user interface 1500 is provided for the user. By clicking on the preview, the user can be navigated to further functionality associated with the map preview. For example, the user can be navigated to a map site that might, for example, provide driving directions associated with the user's particular selection.

Example Methods

FIG. 16 is a flow diagram that describes steps in a global integration method in accordance with one or more embodiments. The method can be implemented in connection with any suitable hardware, software, firmware or combination thereof. In at least some embodiments, aspects of the method can be implemented by a service platform, such as the one shown and described above.

Step 1600 detects, with an operating system, a user action. In the examples above, a user is working within an application such as a legacy application that does not necessarily support services that are desired to be offered. Here, a user action can be one that indicates that the user wishes to learn about and possibly consume one or more services that are not offered by the application. Accordingly, through the user's action, which can constitute any type of action such as a hot key combination, the user can indicate that they wish to learn about offered services. The user action is detected by the operating system and, responsively, step 1602 retrieves a list of services that are not natively supported by the application. The list of services can be retrieved in any suitable way. In the examples above, the list is retrieved through an operating system call to a platform-supported API. Step 1604 displays the list of services for the user. This step can be performed in any way using any suitable user interface. Step 1606 provides a preview of one or more services. This step can be performed in any suitable way. In the examples above, previews are provided responsive to the user taking some action such as hovering their cursor over or near an icon associated with the service or a description of the service. Step 1608 provides access to service functionality which can include, in this example, navigating the user to a remote website where the service functionality is offered. Alternately or additionally, service functionality can be provided locally.

FIG. 17 is a flow diagram that describes steps in a common control integration method in accordance with one or more embodiments. The method can be implemented in connection with any suitable hardware, software, firmware or combination thereof. In at least some embodiments, aspects of the method can be implemented by a service platform, such as the one shown and described above.

Step 1700 provides a control that can be hosted by multiple applications. Examples of such a control are provided above. Step 1702 populates the control with services offered by an application. Here, the services that are offered by the application are those that are natively offered by the application. Step 1704 populates the control with services that are not natively offered by the application. This step can be performed in any suitable way. For example, an API call can be made by the control to an API to retrieve a list of services that are not natively offered by the application. Step 1706 displays a list of populated services for the user. Examples of how this can be done are provided above. Step 1708 provides a preview of one or more services and step 1710 provides access to service functionality associated with one or more of the services. Examples of how this can be done are provided above.

Figure 18:
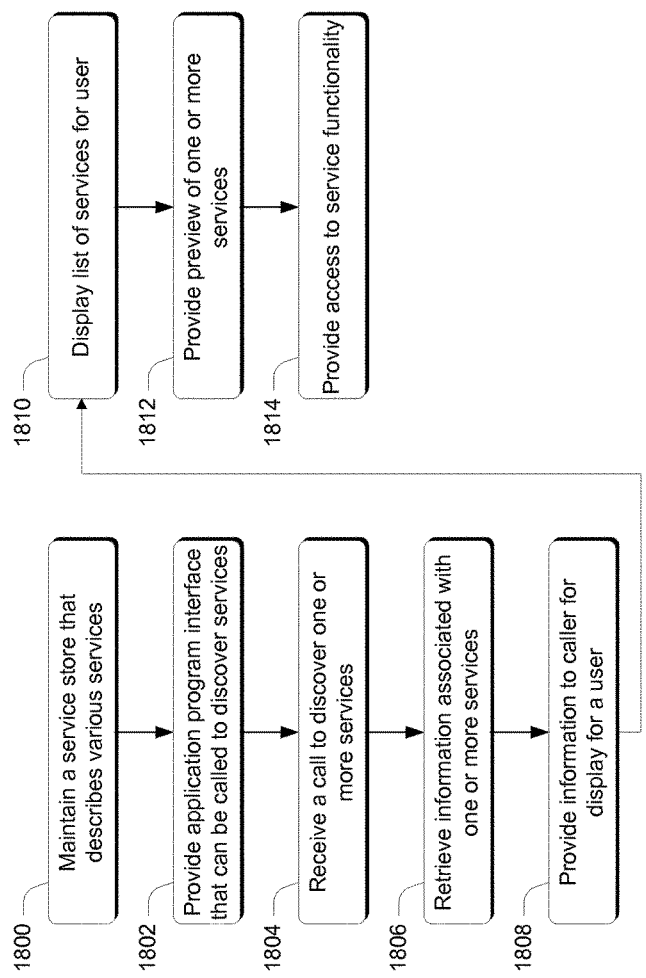
FIG. 18 is a flow diagram that describes steps in a method in accordance with one or more embodiments.

FIG. 18 is a flow diagram that describes steps in a method in accordance with one or more embodiments. The method can be implemented in connection with any suitable hardware, software, firmware or combination thereof In at least some embodiments, aspects of the method can be implemented by a service platform, such as the one shown and described above.

Step 1800 maintains a service store that describes various services. Examples of various services are provided above. Step 1802 provides an application program interface that can be called to discover services. In one or more embodiments, the application program interface can be called by different entities or different types of entities. For example, in some embodiments, a caller might constitute an operating system. An example of this is provided in the global integration layer described above. Alternately or additionally, a caller might constitute a control, such as a common control that can be hosted across different types of applications. An example of this is provided in the common control integration layer described above. Alternately or additionally, a caller might constitute an application that is aware of the application program interface. Collectively, these different types of callers can provide for a robust service platform implementation which supports service offerings across a variety of applications including those that are not aware of services that are offered as well as those applications that are aware of services that can be offered.

Step 1804 receives a call to discover one or more services. As noted above, this call can come from different entities or types of entities. Step 1806 retrieves information associated with one or more services. This step can be performed by accessing a service store, such as the one that is described above. Step 1808 provides information to the caller for display for a user. Specifically, in this example, the retrieved information associated with the services can be provided to the caller so that it can be displayed or otherwise exposed for the user.

Step 1810 displays a list of services for the user. Examples of how this can be done are provided above. Step 1812 provides a preview of one or more services and step 1814 provides access to service functionality. Examples of how this can be done are provided above.

Having described a number of methods that can be implemented in one or more embodiments, consider now an example set of APIs that can be provided by the service platform. It is to be appreciated and understood that the example provided just below is intended to serve as an example only. Accordingly, the example is not meant to limit application of the claim subject matter to the specific APIs shown and described.

Example APIs

In accordance with one or more embodiments, the following set of APIs can be included and exposed by the service platform and/or used by third party providers as indicated. It is to be appreciated and understood that the following set of APIs constitutes an example only. As such, other APIs can be utilized without departing from the spirit and scope of the claimed subject matter.

```
// Represents the different types of data on which an activity may execute.
enum ActivityContentType {
    Selection,
    Link,
    Document };
// There is one activity manager available to the system that manages a list of activities.
IActivityManager
// Get a list of the activities that may execute for a particular activity content type by
group.
-      HRESULT         GetActivityGroupEnumerator(ActivityContentType      type,
IActivityGroupEnumerator**);
// Set the provided activity as the default of its group
- HRESULT SetActivityGroupDefault(IActivity *pActivity);
// Enable or disable an activity.
- HRESULT SetActivityEnabled(IActivity *pActivity, bool fEnabled);
// Remove an activity from the activity manager.
- HRESULT UninstallActivity(IActivity *pActivity);
// Install a declarative activity from an OpenService XML description of that activity that
may be found at the provided URI.
- HRESULT InstallXMLActivity(LPCWSTR pwzActivityXMLURI);
// Install an activity that is based on the provided COM class which implements the
ICOMActivity interface. Those properties that are not defined by the COM class are
provided upon installation (activity's display name, group name, etc).
- HRESULT InstallCOMActivity(REFIID riidCOMClass, LPCWSTR pwzDisplayName,
LPCWSTR pwzHandlerName, LPCWSTR pwzGroupName, LPCWSTR pwzIconPath);
// Represents a list of activity groups.
IActivityGroupEnumerator
// Provides activity groups in sequence. After the final activity group NULL is returned.
- HRESULT Next(IActivityGroup**);
// Represents an activity group.
IActivityGroup
// Get the activity content type on which the activities of this group may execute.
- HRESULT GetType(ActivityContentType type*);
// Get the name of this activity group.
- HRESULT GetName(BSTR**);
// Get the default activity of this activity group. This may be NULL if there is no default.
- HRESULT GetDefaultActivity(IActivity**);
// Get the list of activities of this activity group.
- HRESULT GetActivityEnumerator(IACtivityEnumerator**);
// Represents a list of activities
IActivityEnumerator
// Provides activities in sequence. After the final activity NULL is returned.
- HRESULT Next(IActivity**);
// Represents a single activity
IActivity
// The activity returns true if and only if it may execute input of the specified activity
content type.
- HRESULT CanExecuteType(ActivityContentType type, BOOL*)
```

```
// The activity returns true if and only if it may preview input of the specified activity
content type.
- HRESULT CanPreviewType(ActivityContentType type, BOOL*)
// The activity returns true if and only if it can execute the specified input
- HRESULT CanExecute(IActivityInput *pInput, BOOL*);
// The activity returns true if and only if it can preview the specified input
- HRESULT CanPreview(IActivityInput *pInput, BOOL*);
// The activity will execute the specified input in the provided output context.
- HRESULT Execute(IActivityInput *pInput, IActivityOutputContext *pOutput);
// The activity will execute the specified input in the provided output context.
- HRESULT Preview(IActivityInput *pInput, IActivityOutputContext *pOutput);
// Returns a brief message about what would happen for the execution of the provided
input. For example, the URI to which the activity will navigate upon execution.
- HRESULT GetStatusText(IActivityInput *pInput, BSTR*);
// Returns the display name of the activity, for example, 'Map with Windows Live'.
- HRESULT GetDisplayName(BSTR*);
// Returns the handler name of the activity, for example 'Windows Live'.
- HRESULT GetHandlerName(BSTR*);
// Returns the group name of the activity, for example 'Map'.
- HRESULT GetGroupName(BSTR*);
// Returns the Windows file path to the icon.
- HRESULT GetIconPath(BSTR*);
// Returns true if this activity is the default for its group.
- HRESULT IsDefault(BOOL*);
// Returns a string that uniquely identifies this activity in this activity manager.
- HRESULT GetID(BSTR*);
// This interface is implemented by third party activity implementors. It is a subset of the
methods found in the IActivity interface.
ICOMActivity - Implemented by third party Activity implementer
        HRESULT CanExecuteType/CanPreviewType(ActivityContentType type, BOOL*)
        HRESULT CanExecute/CanPreview(IActivityInput *pInput, BOOL*)
        HRESULT Execute/Preview(IActivityInput *pInput, IActivityOutput *pOutput)
        HRESULT GetStatusText(BSTR*)
// Represents the input text selection, link, or document on which an activity will execute
or preview.
IActivityInput
// Get the value of a named variable. Variables are specific to the input type and are
described by the OpenService specification. The type may be 'text' or 'html' and define
the format in which the variable's value is returned.
        HRESULT      GetVariable(LPCWSTR      pwzVariableName,      LPCWSTR
              pwzOutputType, BSTR*)
// Returns true if the specified named variable defined.
              HRESULT        HasVariable(LPCWSTR  pwzVariableName,      LPCWSTR
pwzOutputType, BOOL*)
// Returns the activity content type of this input.
        HRESULT GetType(ActivityContentType*)
// Represents a browser in which an activity may execute or preview
IActivityOutputContext
// Navigate to the specified URI optionally with the specified HTTP headers and post data
        HRESULT Navigate(BSTR uri, BSTR headers, VARIANT* pvarPostData)
// Set a string of HTML for the browser to render. A caller may only either navigate or
set HTML.
        HRESULT SetHTMLContent(BSTR html)
```

Having described an example set of APIs, consider now an example system that can be utilized to implement one or more of the above-described embodiments.

Example System

Figure 19:
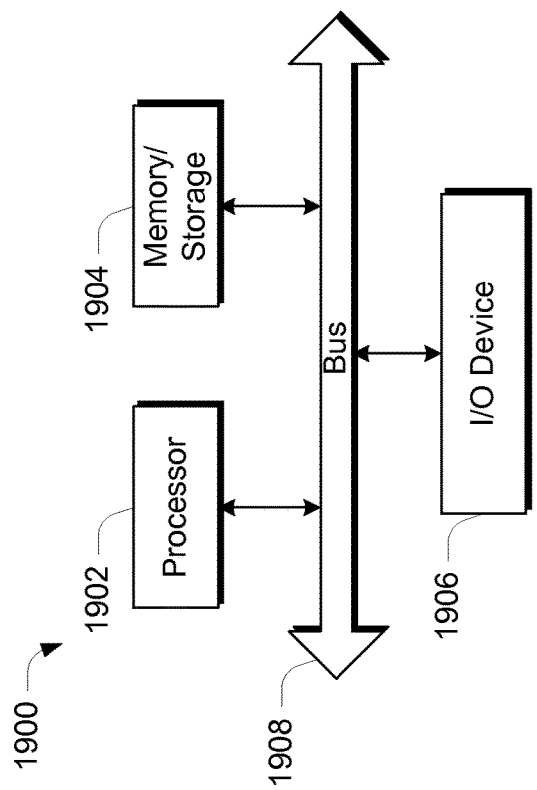
FIG. 19 illustrates an example system that can be used to implement one or more embodiments.

FIG. 19 illustrates an example computing device 1900 that can implement the various embodiments described above. Computing device 1900 can be, for example, computing device 102 of FIG. 1 or any other suitable computing device.

Computing device 1900 includes one or more processors or processing units 1902, one or more memory and/or storage components 1904, one or more input/output (I/O) devices 1906, and a bus 1908 that allows the various components and devices to communicate with one another. Bus 1908 represents one or more of any of several types of bus structures, including a memory bus or memory controller, a peripheral bus, an accelerated graphics port, and a processor or local bus using any of a variety of bus architectures. Bus 1908 can include wired and/or wireless buses.

Memory/storage component 1904 represents one or more computer storage media. Component 1904 can include volatile media (such as random access memory (RAM)) and/or nonvolatile media (such as read only memory (ROM), Flash memory, optical disks, magnetic disks, and so forth). Component 1904 can include fixed media (e.g., RAM, ROM, a fixed hard drive, etc.) as well as removable media (e.g., a Flash memory drive, a removable hard drive, an optical disk, and so forth).

One or more input/output devices 1906 allow a user to enter commands and information to computing device 1900, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments provide a service platform that integrates services, such as web services and/or local services, across a variety of applications. In at least some embodiments, services can be integrated with legacy applications that are "unaware" of such services, as well as applications that are aware of such services.

In at least some embodiments, the platform comprises a multi-layered structure is designed to integrate services across a variety of applications. The multi-layered structure includes, in at least some embodiments, a global integration layer that is designed to integrate services with legacy applications, as well as a common control integration layer and a custom integration layer. The common control integration layer can be used to provide a common control that can be used across applications to integrate not only services of which at the applications are aware, but services of which the applications are not aware. The custom integration layer can be used by various applications to customize user interfaces that are designed to integrate various offered services. In addition, users can have access to their services from many different types of applications regardless of how the applications choose to surface them.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
    a processor; and
    one or more computer-readable storage media having computer-executable instructions stored thereon that, when executed, provide a service platform comprising:
        a global integration layer configured to enable an application to allow a user to access and use one or more services that are not natively supported by the application from within the application;
        a common control integration layer that provides a control configured to be hosted by the application, the control configured to be populated with one or more services that the application natively supports as well as the one or more services that are not natively supported by the application; and
        a custom integration layer that provides a set of Application Programming Interfaces (APIs) that can be used by the application to customize a user interface for integration of at least one service that the application natively supports and at least one service that is not natively supported by the application in accordance with the control;
        the user interface configured to receive a selection of a service and display a preview of the selected service by displaying content from a web address associated with the selected service, the selected service utilizing a declarative model that includes at least a display tag that provides a name of the selected service and a preview tag that provides the web address of the selected service.

2. The computing device of claim 1, wherein the one or more services that are not natively supported by the application include one or more of a search service, a define service, an investigate service, a map service, a news service, an image service, or a translate service.

3. The computing device of claim 1, wherein the application comprises one of a web browser application, a reader application, an e-mail application, or an instant messaging application.

4. The computing device of claim 1, wherein functionality of the global integration layer is supported by an operating system.

5. The computing device of claim 4, wherein the one or more services that are not natively supported by the application can be ascertained at the global integration layer by providing a keyboard shortcut which is detectable by the operating system.

6. The computing device of claim 1, wherein the APIs are configured to be used to manage the one or more services that are not natively supported by the application in the user interface.

7. The computing device of claim 1, wherein the control is configured to use an API call to present available services for integration.

8. The computing device of claim 1, wherein the APIs are configured to be used to receive a list of services available for integration.

9. A computer-implemented method comprising:
    detecting, with an operating system, a user action associated with ascertaining services that are available from within an application;
    retrieving a list of services that are available from within the application, the list of services including at least one service that is not natively supported by the application and at least one service that is natively supported by the application, the retrieving performed responsive to an operating system call to a multi-level platform-supported Application Programming Interface (API);
    causing display of the list of services that includes the at least one service that is not natively supported by the application and the at least one service that is natively supported by the application in a user interface created in response to the multi-level platform-supported API call;
    receiving a selection of the at least one service that is not natively supported by the application from the list of services via the user interface, the selected service utilizing a declarative model that includes at least a display tag that provides a name of the selected service and a preview tag that provides a web address of the selected service; and
    causing, responsive to a particular API call, display of a preview of the selected service that is not natively supported by the application by displaying content from the web address of the selected service.

10. The computer-implemented method of claim 9, further comprising:

providing, separate from the preview, access to service functionality associated with the preview.

11. The computer-implemented method of claim 10, wherein providing the access to the service functionality further comprises navigating to a remote website where the service functionality is offered.

12. The computer-implemented method of claim 9, wherein the retrieving is performed responsive to the detecting.

13. The computer-implemented method of claim 9, wherein the user action comprises a hot key combination.

14. The computer-implemented method of claim 9, further comprising, prior to said causing display of the list of services:

providing a control that can be hosted by multiple applications;

populating the control with services that are natively supported by the application; and populating the control with services that are not natively supported by the application.

15. The method of claim 14, wherein said populating the control with services that are not natively supported by the application is performed by an API call from the control to an API.

16. One or more computer hardware devices having computer-executable instructions stored thereon that, responsive to execution, perform a method comprising:

detecting a user action associated with ascertaining services that are available from within an application;

making an API call to a local service store to receive a list of the services that are available;

causing, in a user interface created in response to the API call, display of the list of services that are available, the list of services including at least one service that is not natively supported by an application and at least one service that is natively supported by the application;

receiving a selection of the at least one service that is not natively supported by the application from the list of services via the user interface, the selected service utilizing a declarative model that includes at least a display tag that provides a name of the selected service and a preview tag that provides a web address of the selected service;

causing, responsive to a particular API call, display of a preview of the selected service that is not natively supported by the application by displaying content from the web address of the selected service; and providing, separate from the preview, access to service functionality associated with the preview.

17. One or more computer hardware devices of claim 16, wherein the method further comprises:

receiving a selection of the preview of the selected service; and navigating to a remote website associated with the selected service.

18. One or more computer hardware devices of claim 17, wherein the navigating includes sending data associated with the selected service to the remote website.

19. One or more computer hardware devices of claim 16, wherein the access comprises local access to the service functionality associated with the preview.

20. One or more computer hardware devices of claim 16, wherein the service comprises a map service, and wherein the preview comprises a preview map.

\* \* \* \* \*